United States Patent
Hayes et al.

(10) Patent No.: US 10,174,509 B2
(45) Date of Patent: Jan. 8, 2019

(54) FLOORING SYSTEM INCLUDING A MATERIAL DISPLAYING DILATANT PROPERTIES, AND METHODS FOR INSTALLATION OF AN ATHLETIC FLOORING SYSTEM

(71) Applicant: Mission V Sports, LLC, New Lenox, IL (US)

(72) Inventors: Steve Hayes, New Lenox, IL (US); Cyrus K Schenck, Shelburne, VT (US)

(*) Notice: Subject to any disclaimer, the term of this patent is extended or adjusted under 35 U.S.C. 154(b) by 0 days.

(21) Appl. No.: 15/859,933

(22) Filed: Jan. 2, 2018

(65) Prior Publication Data
US 2018/0347207 A1 Dec. 6, 2018

Related U.S. Application Data

(60) Provisional application No. 62/513,948, filed on Jun. 1, 2017.

(51) Int. Cl.
| | |
|---|---|
| *E04F 15/22* | (2006.01) |
| *E04F 15/02* | (2006.01) |
| *E01C 13/08* | (2006.01) |
| *B32B 21/08* | (2006.01) |

(Continued)

(52) U.S. Cl.
CPC ............ *E04F 15/225* (2013.01); *B32B 21/08* (2013.01); *E01C 13/08* (2013.01); *E04F 15/02177* (2013.01); *B32B 2471/00* (2013.01); *E04F 15/04* (2013.01); *E04F 15/10* (2013.01)

(58) Field of Classification Search
CPC ... E04F 15/225; E04F 15/02177; E04F 15/10; E04F 15/04; B32B 21/08; B32B 2471/00; E01C 13/08

USPC .............. 52/403.1, 408, 409, 411, 412, 413, 52/506.01, 508

See application file for complete search history.

(56) References Cited

U.S. PATENT DOCUMENTS

4,301,207 A * 11/1981 Schomerus ............. E01C 13/06
442/43
5,103,614 A * 4/1992 Kawaguchi ........... E04F 15/022
52/392

(Continued)

FOREIGN PATENT DOCUMENTS

| CN | 105401537 A1 | 3/2006 | |
|---|---|---|---|
| WO | WO-2010031217 A1 * | 3/2010 | .............. E04F 15/02 |

(Continued)

OTHER PUBLICATIONS

From kemi intressen Rheological control additives p. 1: Rheological control additives Coatings & Construction / Coatings / Flooring Retrieved: Mar. 14, 2017.

*Primary Examiner* — Brent W Herring
(74) *Attorney, Agent, or Firm* — Caldwell Intellectual Property

(57) ABSTRACT

A flooring system includes at least two discrete layers, the at least two discrete layers including at least a first discrete layer, wherein at least a portion of the least a first discrete layer includes a first material displaying dilatant properties, at least a second discrete layer. A method for assembly of an athletic flooring system includes installing at least a first discrete layer, wherein at least a portion of the least a first discrete layer includes a first material displaying dilatant properties and installing at least a second discrete layer.

14 Claims, 8 Drawing Sheets

(51) Int. Cl.
*E04F 15/04* (2006.01)
*E04F 15/10* (2006.01)

(56) References Cited

U.S. PATENT DOCUMENTS

| | | | | |
|---|---|---|---|---|
| 5,299,401 A * | 4/1994 | Shelton | E04F 15/225 | 52/393 |
| 5,411,352 A | 5/1995 | Eren | | |
| 5,433,052 A * | 7/1995 | Niese | E04F 15/04 | 52/403.1 |
| 5,540,024 A * | 7/1996 | Stalford | E04F 15/22 | 52/390 |
| 5,566,930 A * | 10/1996 | Niese | E04F 15/04 | 267/141.1 |
| 6,070,381 A * | 6/2000 | Blumer | E04F 15/22 | 156/71 |
| 6,122,873 A * | 9/2000 | Randjelovic | E04F 15/22 | 52/391 |
| 6,328,833 B1 | 12/2001 | Holeschovsky et al. | | |
| 6,367,217 B1 * | 4/2002 | Niese | E04F 15/225 | 52/403.1 |
| 6,518,348 B1 | 2/2003 | Lee et al. | | |
| 6,557,314 B2 * | 5/2003 | Shelton | E04F 15/225 | 52/403.1 |
| 6,584,745 B1 * | 7/2003 | Johansson | E04B 5/48 | 248/188.4 |
| 6,637,169 B2 * | 10/2003 | Niese | E04F 15/225 | 52/403.1 |
| 6,701,529 B1 * | 3/2004 | Rhoades | C08L 83/14 | 2/2.5 |
| 7,096,631 B1 * | 8/2006 | Counihan | E04F 15/22 | 52/403.1 |
| 7,499,846 B2 | 3/2009 | Massingill et al. | | |
| 7,694,480 B2 * | 4/2010 | Niese | E04F 15/22 | 472/92 |
| 7,829,149 B2 | 11/2010 | Suk et al. | | |
| 7,918,167 B2 * | 4/2011 | Tanielian | E01F 13/12 | 102/303 |
| 8,186,117 B2 * | 5/2012 | Eren | E01C 3/06 | 404/31 |
| 8,307,597 B2 * | 11/2012 | Tucker, Jr. | E04F 15/022 | 52/403.1 |
| 8,347,575 B2 * | 1/2013 | Bierwirth | E04F 15/182 | 181/284 |
| 8,898,982 B2 * | 12/2014 | Tucker, Jr. | E04F 15/022 | 52/403.1 |
| 8,955,279 B1 * | 2/2015 | Clairmont | E04F 15/225 | 52/403.1 |
| 9,267,285 B2 | 2/2016 | Tauferner | | |
| 9,550,864 B2 * | 1/2017 | Bloomfield | C08G 77/16 | |
| 9,803,379 B2 * | 10/2017 | Randjelovic | E04F 15/225 | |
| 10,011,686 B2 * | 7/2018 | Bloomfield | C08G 77/16 | |
| 2002/0092255 A1 * | 7/2002 | Niese | E04F 15/225 | 52/480 |
| 2002/0119276 A1 * | 8/2002 | Skaja | B32B 3/26 | 428/44 |
| 2002/0189184 A1 * | 12/2002 | Shelton | E04F 15/225 | 52/403.1 |
| 2004/0171321 A1 | 9/2004 | Plant | | |
| 2005/0098263 A1 | 5/2005 | Robbins et al. | | |
| 2005/0164580 A1 | 7/2005 | Holeschovsky | | |
| 2005/0166797 A1 | 8/2005 | Li et al. | | |
| 2006/0260210 A1 * | 11/2006 | Tanielian | E01F 13/12 | 52/2.11 |
| 2007/0039269 A1 * | 2/2007 | Niese | E04F 15/22 | 52/403.1 |
| 2007/0149079 A1 | 6/2007 | Vito et al. | | |
| 2009/0286910 A1 | 11/2009 | Bloomfield | | |
| 2009/0293398 A1 * | 12/2009 | Eren | E01C 3/06 | 52/403.1 |
| 2010/0247856 A1 * | 9/2010 | Vito | A63B 71/0054 | 428/138 |
| 2011/0214377 A1 * | 9/2011 | Tucker, Jr. | E04F 15/022 | 52/403.1 |
| 2011/0314589 A1 * | 12/2011 | Vito | A42B 1/08 | 2/181 |
| 2012/0021167 A1 * | 1/2012 | Plant | A41D 13/0156 | 428/116 |
| 2012/0055108 A1 * | 3/2012 | Bierwirth | E04F 15/182 | 52/403.1 |
| 2012/0135190 A1 * | 5/2012 | Browne | B60C 11/00 | 428/141 |
| 2012/0315443 A1 * | 12/2012 | Woolstencroft | E04C 2/3405 | 428/178 |
| 2013/0017372 A1 | 1/2013 | Mechling et al. | | |
| 2013/0061547 A1 * | 3/2013 | Tucker, Jr. | E04F 15/022 | 52/403.1 |
| 2013/0302561 A1 * | 11/2013 | Vito | A42B 1/08 | 428/138 |
| 2013/0302601 A1 * | 11/2013 | Vito | A42B 1/08 | 428/354 |
| 2014/0017436 A1 * | 1/2014 | Vito | A42B 1/08 | 428/76 |
| 2015/0016885 A1 | 1/2015 | Barron et al. | | |
| 2015/0033588 A1 | 2/2015 | Lai | | |
| 2015/0045471 A1 * | 2/2015 | Bloomfield | C08G 77/16 | 521/154 |
| 2015/0335985 A1 | 11/2015 | Schenck et al. | | |
| 2015/0344635 A9 * | 12/2015 | Bloomfield | C08G 77/16 | 521/154 |
| 2016/0176163 A1 * | 6/2016 | Brown | B32B 17/064 | 428/38 |
| 2016/0186019 A1 * | 6/2016 | Negri | C04B 26/18 | 52/745.09 |
| 2017/0233531 A1 * | 8/2017 | Bloomfield | C08G 77/16 | 524/852 |

FOREIGN PATENT DOCUMENTS

WO   WO2011029637 A1   3/2011
WO   WO2016071264 A1   5/2016

* cited by examiner

FLOORING SYSTEM INCLUDING A MATERIAL DISPLAYING DILATANT PROPERTIES, AND METHODS FOR INSTALLATION OF AN ATHLETIC FLOORING SYSTEM

RELATED APPLICATION DATA

This application claims the benefit of priority of U.S. Provisional Patent Application Ser. No. 62/513,948, filed on Jun. 1, 2017, and titled "FLOORING SYSTEM INCLUDING A NON-NEWTONIAN MATERIAL, AND METHODS FOR INSTALLATION OF AN ATHLETIC FLOORING SYSTEM," which is incorporated reference herein in its entirety.

FIELD OF THE INVENTION

The present invention generally relates to the field of flooring. In particular, the present invention is directed to a flooring system including a non-Newtonian material, and methods for installation of an athletic flooring system.

BACKGROUND

Athletic flooring must be carefully designed to permit maximal athletic performance while limiting injury and fatigue. Both goals have traditionally been addressed by constructing sprung floors that rebound elastically from impacts, cushioning athletes' bodies when running and jumping and subtly enhancing their performance by providing a slight recoil force. The elastic nature of sprung floors, however, creates an additional problem, because of the tendency of elastic objects to vibrate harmonically. The vibration can make the floor slightly harder to navigate, and can cause fatigue and injury to athletes in its own right. Typical sprung floors thus have pads or blankets of damping material installed to limit the floors' elastic response and stop vibration. These damping pads and blankets must generally be thick to be effective, necessitating thick subfloors and increasing expense of construction. Furthermore, floors incorporating the pads cannot respond optimally to all conditions: the balance between elasticity and damping is crucial; too much elasticity increases vibration and fatigue, while too little increases injury. This balance is upset to one extreme or the other when exposed to higher and lower velocity impacts in the course of athletic endeavors.

SUMMARY OF THE DISCLOSURE

In one aspect, a flooring system includes at least two discrete layers. The at least two discrete layers include at least a first discrete layer, with at least a portion of the least a first discrete layer including a first material displaying dilatant properties. The at least two discrete layers include at least a second discrete layer.

In another aspect, a method of assembling an athletic flooring system includes installing at least a first discrete layer, where at least a portion of the least a first discrete layer includes a first material displaying dilatant properties. The method includes installing at least a second discrete layer.

In an additional aspect, a method of converting an athletic flooring system having at least a subfloor and a wear layer includes removing the wear layer. The method includes installing a material displaying non-Newtonian properties in the subfloor.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
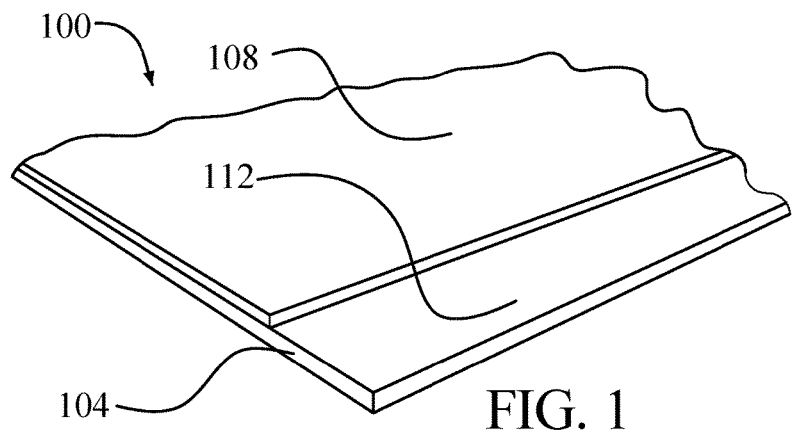
FIG. 1 is a perspective view of an exemplary flooring system in accordance with the present invention.

In one aspect, the present invention is directed to an athletic flooring system incorporating non-Newtonian material. Flooring system may include a wear layer which may be finished to specification for a range of athletic, dance, or similar activities. In an embodiment, wear layer is supported by a subfloor that provides elasticity, which may be damped. Non-Newtonian material may be used to damp vibration and elastic response. In some embodiments, the use of non-Newtonian material to damp vibration and elastic response enables athletic flooring system to provide optimal elasticity and vibration control in response to impacts with widely varied kinetic energies.

Non-Newtonian materials have properties that distinguish them from other materials. When subjected to an increase rate of shear deformation, non-Newtonian materials undergo a change in apparent rigidity and/or apparent viscosity. Non-Newtonian materials classified as pseudoplastic or shear-thinning materials demonstrate decreased apparent rigidity and/or apparent viscosity in response to an increasing shear rate. Non-Newtonian materials classified as dilatant or sheer-thickening materials demonstrate decreased apparent rigidity and/or apparent viscosity in response to an increasing shear rate. For example, a dilatant material may behave like low viscosity fluid under small or absent shear deformation, but behave as a highly viscous fluid under higher rates of shear deformation. Other dilatant materials may behave as a solid or quasi-solid material when subjected to high rates of shear deformation, while behaving as a low-viscosity fluid under low or absent shear deformation. Still other dilatant materials may behave as flexible or elastomeric solids or quasi-solids when subjected to little or no shear deformation, but as highly rigid solids under high shear deformation rates. Rheopectic materials demonstrate an increase in apparent viscosity or rigidity with increased time periods of agitation or shear stress; in other words, rheopectic materials have time-dependent shear-thickening behavior. Thixotropic materials exhibit a time-dependent increase in pseudoplastic behavior.

The normal or resting condition of a non-Newtonian material (i.e., the condition where the non-Newtonian material is experiencing little or no shear deformation) and the opposite or ending point where the non-Newtonian material is subjected to a high rate of shear deformation may define the endpoints of a portion of a spectrum; one end of the spectrum may be described as "fluidity," while the other may represent "rigidity." Some non-Newtonian materials may cover the full range of the spectrum, while others may cover only part of the spectrum. For instance, a non-fluid non-Newtonian material may range from soft, elastic or flexible at one extreme along the spectrum to a rigid solid at the other end, but may not arrive at a fluid or apparently fluid form, at least in the temperature range in which it is tested; the non-fluid non-Newtonian material in this example may still be defined as lying on the spectrum, as its softer extreme is closer in form to fluid than its more rigid extreme. Adjustment of forces that act on a non-Newtonian material, the types of ingredients in the non-Newtonian material, or the quantities of ingredients in the non-Newtonian material may shift the region on the spectrum represented by the non-Newtonian material toward the rigid or fluid end of the spectrum, or increase or decrease the span of the region on the spectrum for that material. As an example, a dilatant material subjected to a high rate of shear deformation may be driven in the direction of rigidity on the spectrum, while cessation of the shear deformation may drive the material toward fluidity.

As movement along the spectrum is affected by shear rate, the timescale over which shear force is applied to a non-Newtonian material may affect its movement along the spectrum. For instance, a gradually applied shear force to a dilatant material may result in a small or negligible increase in viscosity or rigidity, while a shear force applied rapidly may result in a drastic increase in viscosity or rigidity. This effect may be observed for instance in the shear-thickening fluid contents of carnivorous pitcher plants, which become increasingly viscous, and thus difficult to move through, as prey struggles, but allow the prey to sink into the fluid under the influence of gravity. As a further example, a dilatant suspension of cornstarch in water, sometimes known as "Oobleck," may support a person stepping rapidly or "dancing" on its surface, while allowing a person who stands or walks slowly on the surface to sink into the material; the opposite effect is observed in water-impregnated "quicksand," which demonstrates pseudoplastic properties, causing a swimmer trapped in the quicksand to sink faster when struggling harder. Timescale limits under which non-Newtonian behavior is observable may depend upon various factors, including characteristics of the force applied to the material, and the type of non-Newtonian material involved.

Non-Newtonian materials may be modeled according to a "power law," wherein the apparent viscosity of the material, defined as viscosity in liquids or more generally viscosity-like resistance to shear forces, is characterized by the equation $\eta = K \dot{\gamma}^{n-1}$, where $\eta$ is the apparent viscosity of the material, K is a positive material-specific constant, and $\dot{\gamma}$ is the applied shear rate. Where n is less than 1, the material represented in the equation is pseudoplastic, and the apparent viscosity of the material is proportional to a negative power of the applied shear rate. Where n is greater than 1, the material represented in the equation is dilatant, and the apparent viscosity of the material is proportional to a positive power of the applied shear rate. Note that the positive power may be a non-constant positive power; that is, the positive power may be approximately constant or may vary while still exceeding zero. For instance, (n−1) may vary between 0.5 and 3, but remain greater than zero, and still be considered a positive power for the purposes herein. Persons skilled in the art will also be aware that material properties of any material can be described by a single equation only within a limited range of parameters, and that a property described for a material is described for the material as subjected to parameters of typical use; thus, for instance, a dilatant material used in a flooring application is a material exhibiting shear-thickening behavior within the range of temperatures and forces to which that form of flooring is subjected during intended use. Similarly, a material described as elastic is a material that behaves in an elastic manner within the intended range of temperatures and forces, and, for instance, may become rigid at very low temperatures, fluid at very high temperatures, and unable to rebound from excessive forces.

Various mechanisms may cause dilatant behavior in a material, independently or in combination. In shear-induced ordering, alignment of particles in the dilatant material may increase as a shearing force is applied; increasingly aligned particles may behave in an increasingly rigid manner. In addition, or alternatively, particles within the dilatant material maybe ordered at low shear rates, and become increasingly disordered at higher shear rates, resulting in greater apparent viscosity or rigidity. Another factor which may contribute to dilatant behavior may be change in volume of one or more ingredients, such as molecules whose volume expands under shear forces; this increase in volume may increase apparent rigidity or viscosity of dilatant material. Another factor which may increase apparent rigidity and/or apparent viscosity in dilatant material may be friction between particles that increases with increased shear rate, inhibiting movement of particles past each other. An additional factor that may increase apparent viscosity or apparent rigidity with increased shear rate may be attraction between molecules that increases with application of shear force. Another factor that may cause dilatant behavior may be a shear force overcoming repulsive forces between particles, allowing them to clump together. In suspensions of particles in liquids or gels, increases in shear rate may cause micro assembly clusters that increase resistance to shear and viscosity.

An additional factor that may cause dilatant behavior may be observed in certain polymeric materials, wherein shear-induced crosslinking between molecular elements may increase viscosity and/or resistance to shear force. Another factor that may contribute to dilatant behavior may be the formation of shear-induced non-Gauss chains in polymeric materials. An additional factor that may contribute to dilatant behavior in polymeric materials may be the formation of space network structure in response to shear rate increases. It should be understood that the above list of interactions and mechanisms is not intended to be exhaustive, and that shear thickening behavior may be the result of any phenomenon or interaction, or combination of phenomena or interactions including those listed above and any others, as would be apparent to one skilled in the art. A non-limiting example of a dilatant polymer material is polyborodimethylsiloxane and chemical and physical analogs thereof.

In some embodiments, decrease in shear rate, for instance by reduction or removal of shearing force, may have the opposite effect in non-Newtonian material of increasing shear rate. For example, a dilatant material under a high shearing force may be apparently solid or viscous, and may become increasingly soft or fluid as the shearing force is reduced or removed.

Several categories of non-Newtonian materials will now be described. It should be understood that this list is not intended to be exhaustive, and any suitable types of dilatant material are contemplated for use in the disclosed embodiments.

Non-Newtonian materials may include dilatant fluids. A dilatant fluid may possess the characteristics of a fluid until it encounters a shear force, whereupon the dilatant fluid will thicken (e.g., move toward rigidity), and behave more like a higher viscosity fluid, quasi-solid, or solid. The shear force may be supplied by any suitable form of agitation, including without limitation direct or indirect impact of an object against the dilatant fluid. The dilatant fluid may return to a lower-viscosity or more liquid state upon cessation or reduction of the shear force. Dilatant fluid may include a colloid, composed of suspended particles in a liquid medium. A non-limiting example of a liquid medium may be polyethylene glycol; a non-limiting example of particles suspended in the liquid medium may be silica particles. Any suitable medium or particles may be used. In the absence of shear force, or when being acted on by shear forces applied slowly, the particles may float freely in the liquid medium without clumping or settling, owing to a slight mutual repulsion between the particles. An increase in shear rate, for instance due to a sudden impact, may overcome the repulsion, allowing the particles to clump together, increasing viscosity or apparently solid properties. When the shear rate decreases, the repulsion may push the clumps apart, causing fluid-like behavior again. Dilatant fluids may be used to make films, resins, finishes, and coatings that exhibit dilatant behavior. Persons skilled in the art will be familiar with methods used to make films, finishes, and coatings using fluids.

Non-Newtonian materials may include dilatant gels. Dilatant gels may have the characteristics of high-viscosity fluids, quasi-solids, or intermediate forms. Dilatant gels may have a similar composition to dilatant fluids, but may exhibit higher apparent viscosity or rigidity. In some embodiments, dilatant gels have the same ingredients as dilatant fluids, but may exist in a gel form due to one or more of various factors, including additional ingredients that cause the liquid medium to become gelatinous or environmental conditions. Dilatant gels may exhibit similar qualities to jellies, putties, or clays. At low or absent shear rates, dilatant gels may be deformed with application of little or no force, while at higher shear rates such as those resultant from the energy of a sudden impact, dilatant gels may become increasingly rigid, with an improving resistance to deformation. The mechanisms that cause dilatant behavior in other dilatant materials may cause dilatant behavior in dilatant gels.

Dilatant fluids or gels may be encapsulated to produce another dilatant material. Encapsulated dilatant fluids or gels may include containers filled with dilatant fluids or gels. Containers may include one or more flexible or rigid walls; walls may also be constructed wholly or in part of dilatant material. Containers may be designed to receive vibrations or impact forces and transmit the vibrations or impact forces to the dilatant fluid or gels. The resulting increase in viscosity or rigidity of the enclosed dilatant fluids or gels may cause the apparent rigidity of the containers to increase.

Dilatant foams are another kind of non-Newtonian material. Dilatant foam may be formed by confining physically or chemically produced bubbles of gas in dilatant gel or fluid. The resulting material may be solidified. Dilatant foam may have similar behavior to other dilatant materials; for instance, increased shear rate caused by a sudden impact or other event may cause dilatant foam to become more rigid, while under reduced shear rates the dilatant foam may be softer or more flexible.

Dilatant solids are another category of non-Newtonian materials. Dilatant solids may be produced by solidifying dilatant gels or fluids, or by introducing dilatant material into solid objects. Processes such as extrusion or injection molding may be used to produce dilatant solids. Dilatant solids may exhibit similar behavior to other dilatant materials; for instance a dilatant solid may be relatively flexible or elastic under lower shear rates, but may be more rigid or hard when subjected to high shear rates, such as those resultant from a sudden impact. Similar mechanisms to those causing shear thickening in other dilatant materials may produce shear-thickening behavior in dilatant solids.

An additional kind of dilatant material includes dilatant filaments. A dilatant filament may be formed by any suitable processes, or combination of processes, including, for example, injection molding, extrusion, or spinning out of a melt. The dilatant filament may exhibit the characteristics of a dilatant solid.

An additional kind of dilatant material includes impregnated fibers. An impregnated fiber may include, for example, a fiber or yarn that has absorbed, and/or is coated with, a dilatant material. The fiber may include a high strength polymeric fiber. The dilatant material may be a fluid, and may retain its fluid characteristics after impregnation. This may help to ensure that the impregnated fiber will remain flexible, while endowing the fiber with dilatant properties.

An additional kind of dilatant material includes impregnated fiber reinforced materials. An impregnated fiber reinforced material may include, for example, a fabric that has absorbed, and/or is coated with, a dilatant material. Additionally or alternatively, the impregnated fiber reinforced material may include previously impregnated fibers woven together to form a fabric. It is also contemplated that the impregnated fiber reinforced material may include a fabric made by weaving together dilatant filaments and/or impregnated fibers. It is further contemplated that the fabric or fibers may be set into another medium to reinforce that medium. It is also contemplated that dilatant materials may be mixed in with the medium to impart dilatant properties to the medium.

The impregnated fiber reinforced material may exhibit dilatant behaviors, similar those described above with respect to the other categories of dilatant materials. For example, the coefficient of friction between the fibers, and/or between the fibers and the medium, will increase during an impact event, causing the fibers and/or medium to become more rigid. It is further contemplated that the fibers may form a substrate that, when a dilatant material permeates the fibers, holds particles of the dilatant material in place. When an object suddenly strikes the impregnated fiber reinforced material, the dilatant material will immediately thicken or harden, imparting its hardness to the overall construction. The flexibility of the overall construction will return upon removal of the force.

Non-Newtonian textile represents another category of non-Newtonian material. A non-Newtonian textile may be formed using any non-Newtonian fibers, non-Newtonian fiber-reinforced materials, or fibers impregnated with non-Newtonian material. Fibers or fiber-reinforced material may formed into non-Newtonian textile by any suitable process for combining fibers or fiber-reinforced materials into textiles, including without limitation weaving fibers or fiber-reinforced materials and matting fibers or fiber-reinforced materials.

An additional kind of dilatant material includes dilatant composites. A dilatant composite may include, for example, a solid foamed synthetic polymer. The solid foamed synthetic polymer may include an elastic, and/or an elastomeric matrix. The elastomeric matrix may retain its own boundaries without need of a container. The composite may also include a polymer-based dilatant different from the solid foamed synthetic polymer. The polymer-based dilatant may be distributed through the matrix and incorporated therein during manufacture. The composite may also include a fluid distributed through the matrix. The combination of the matrix, dilatant, and fluid may be selected such that the composite may be resiliently compressible (i.e., display resistance to compressive set), and preferably also flexible.

Another dilatant composite may include a solid, closed cell foam matrix and a polymer-based dilatant, different from the matrix, distributed through the matrix. The composite may also include a fluid distributed through the matrix. The combination of matrix, dilatant, and fluid may be selected such that the composite may be resiliently compressible.

In either of the dilatant composites described above, any suitable solid materials may be used as the matrix, including, for example, elastomers. This may include natural elastomers, as well as synthetic elastomers, including synthetic thermoplastic elastomers. These may include elastomeric polyurethanes, silicone rubbers, and ethylene-propylene rubbers. Any polymer-based dilatant that may be incorporated into the matrix may be used in the dilatant composites. The dilatant may be selected from silicone polymer-based materials, such as borated silicone polymers. The dilatant may be combined with other components in addition to the components providing the dilatancy, including, for example, fillers, plasticisers, colorants, lubricants and thinners. The fillers may be particulates (including microspheres), fibrous, or a mixture of the two. It is contemplated that a borated siloxane-based material may be used as a dilatant.

An additional kind of dilatant material includes dilatant layers. A dilatant layer may include a layer of material formed from one of, or a combination of, the above-categories of dilatant materials. The dilatant layer may be combined with layers having other properties, such that the combined layers may exhibit some form of dilatant behavior as a result.

The use of the terms "non-Newtonian materials" and/or "dilatant materials" in the following description of flooring systems is meant to cover all categories of non-Newtonian and/or dilatant materials known to those skilled in the art, including without limitation the categories and examples of non-Newtonian and/or dilatant materials described herein.

Referring now to FIG. 1, an exemplary flooring system 100 is illustrated. Flooring system 100 includes at least two discrete layers; at least two discrete layers include at least a first discrete layer 104 and at least a second discrete layer 108. At least a first discrete layer 104 includes at least a portion 112 that includes a first material. First material displays dilatant properties. At least a second discrete layer 108 may include a top or wear layer of flooring system 100; at least a first discrete layer 104 may include elements of a sub-floor beneath top or wear layer. In an embodiment, two layers are discrete where a clear boundary between the two layers exists, and material of the two layers does not substantially intermix. It is to be noted in the description that follows that in the interest of clarity not every element of the illustrated examples is labeled, particularly where many substantially identical examples of elements are present.

Still referring to FIG. 1, first material may include any kind of dilatant material as described above, including dilatant solids, fluids, gels, foams, capsules, and the like. First material may be included in a non-fluid package, which may be any unit of material that does not allow the escape or evaporation of fluid or fluid-like elements of dilatant material; non-fluid package may exhibit behavior of a solid when interacting with elements outside non-fluid package. As a non-limiting example, non-fluid package may include a unit of encapsulated dilatant liquid or gel, as described above. Non-fluid package may include solidified dilatant foam. Non-fluid package may include a dilatant solid. Non-fluid package may include a unit of material composed wholly or in part of dilatant fibers, dilatant-material impregnated fibers, dilatant material-impregnated fiber reinforced material, a dilatant composite material, or a dilatant layer material, as described above.

Continuing to refer to FIG. 1, at least a first discrete layer 104 may include at least a capsule containing first material; at least a capsule may be a plurality of capsules. At least a capsule may have flexible walls. At least a capsule may be formed to any shape or a part of any shape described below for exemplary forms of at least a portion 112 of at least a first discrete layer 104; at least a capsule may be assembled in a desired form by creating capsule walls of desired dimensions and filling with dilatant material, by cutting a previously formed capsule into a desired size or shape, or by combining previously formed capsules into a desired size or shape. Cutting capsule may further include sealing walls of capsule together at locus of cut, for instance by heat-sealing.

With continued reference to FIG. 1, at least a first discrete layer 104 may include at least a pad of first material; for instance, at least a pad may be composed of dilatant foam, solid, textile material, or composite material. At least a pad may include a plurality of pads. At least a pad may be formed to any shape or a part of any shape described below for exemplary forms of at least a portion 112 of at least a first discrete layer 104; forming may be accomplished by assembling, matting, or weaving pad to desired size or shape, or by forming to a standard shape and either cutting or assembling standard-shaped pad or pads to desired size or shape of padding.

Still referring to FIG. 1, first material may display dilatant properties. For instance, first material may be apparently flexible or soft when subjected to low shear rates, such as slow-acting forces. First material may become harder or more rigid when subjected to higher stress rates. Thus, first material may be relatively pliable when a person is walking or standing on flooring system 100, but may become more rigid when a person is running or jumping on flooring system 100.

Continuing to refer to FIG. 1, first material may be incorporated in at least a first discrete layer 104 in any suitable manner. In an embodiment, substantially all of at least a first discrete layer is made up of first material; for instance, all or substantially all of at least a first discrete layer 104 may be a pad, or set of pads or capsules assembled into padding, of first material. At least a first discrete layer 104 may include a layer or sublayer that is substantially all made up first material. In an embodiment, first material is combined with additional material in at least a portion 112; for instance, at least a portion 112 may combine first material with elastic material, resulting in at least a portion 112 that exhibits damped elastic behavior wherein the elastic materials produce elastic recoil when deformed and the first material resists motion to a degree proportional to a positive power of the velocity of deformation and/or recoil. As a non-limiting example, at least a first discrete layer may include a plurality of strips or "feet" of material combining first material and an elastic material on which the remainder of the flooring system rests, for instance to provide resiliency in portable athletic flooring.

Figure 2A:
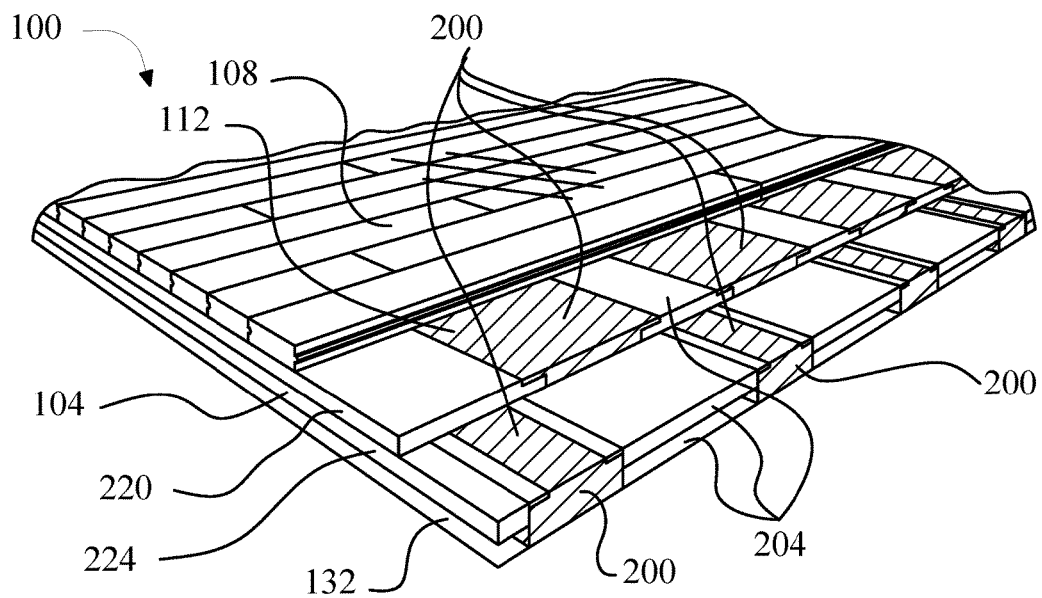
FIG. 2A is a perspective view of an exemplary flooring system in accordance with the present invention.

Referring now to FIG. 2A, in an embodiment, at least a first discrete layer 104 includes a plurality of sections of first material 200 and a plurality of sections of at least a second material 204. Each of plurality of sections of first material 200 may have any desired form. For instance, each of the plurality of sections of first material 200 may have a substantially rectilinear or board-like form. Each of plurality of sections may have any three-dimensional or two-dimensional form encompassing regular or irregular polygonal, polyhedral, curved or combined forms. Each of plurality of sections of first material 200 may run substantially all the length or breadth of flooring system 100; for instance, plurality of sections of first material 200 may form a stripe-like pattern across at least a second discrete layer 108.

In an embodiment, and continuing to refer to FIG. 2A, each of plurality of sections runs less than a full length or breadth of flooring system 100; as a non-limiting example, plurality of sections of first material 200 and plurality of sections of at least a second material 204 may form a tessellated pattern, such as a checkerboard-like pattern of rectilinear forms, a pattern of adjacent polygonal forms, curved forms, combinations thereof, or other spaces. Tessellated plurality of sections of first material 200 and plurality of sections of second material may include patterns of identical forms or varied forms; for example, different sections may have different shapes or sizes that combine to form at least a first discrete layer 104. In an embodiment, first material is used in specific locations of flooring system 100; for instance, first material may be concentrated to a greater extent toward the middle of flooring system 100, than toward the periphery. First material may alternatively be distributed substantially equally across flooring system 100. Sections may be arranged in a staggered brick pattern with ends offset by a prescribed amount to ensure overlap.

In an embodiment, and still referring to FIG. 2A, plurality of sections 200 of first material include other materials. As a non-limiting example, plurality of sections of first material may contain intermixed dilatant and non-dilatant materials; for instance dilatant material may be intermixed with elastic material in solid or foamed form. Dilatant material may be woven into non-dilatant material; for instance, filaments or fibers of dilatant material, or filaments, fibers, or textile impregnated with dilatant material, may be woven into non-dilatant material. Dilatant material may be layered with non-dilatant material in vertical, horizontal, radial, or other arrangements of layers. Sections 200 may include a pad, capsule, or other element containing dilatant material with another component of non-dilatant material on top of or underneath the dilatant element. For instance, a pad of dilatant material may be located above or below a slatted or otherwise ducted block of solid material, with air passages through the block running directly or through connection to other passages or voids to one or more outlets in flooring system 100; this may permit active or passive circulation of air to reduce or control humidity. Dilatant material element may also be located above or below a void to produce a similar effect. In some embodiments, blowers (not shown) or links to HVAC systems (not shown) may permit air with desired temperature or humidity characteristics to be blown through passages and/or voids to regulate temperature and/or humidity in flooring system 100. In some embodiments, the ability of dilatant material to produce comparable results to conventional materials with less volume of material may permit the introduction of further ventilating passages, voids, ducts, or other elements to enable improved air circulation compared to conventional flooring solutions.

Still referring to FIG. 2A, each section of plurality of sections of at least a second material 204 may have any size or shape suitable for a section of the plurality of sections of first material 200. Dimensions and shapes of plurality of sections of at least a second material 204 may complement dimensions and shapes of plurality of sections of at least a first material. At least a second material may include air; in other words, at least a second material may include one or more voids; voids may be adjacent to sections of the plurality of sections of first material 200, or in other words there may be air gaps between at least a first material and other non-air materials in at least a first discrete layer 104. In an embodiment, all of at least a second material is air; that is, at least a first discrete layer 104 may include a set of sections of first material 200 separated by voids. At least a second material may include a substantially rigid material. Substantially rigid material may be any rigid material suitable for the construction of flooring, including without limitation wood, which may include cut or sawn boards of any type of wood, layered wood products such as plywood, other wood composites such as particle board, or engineered wood. Substantially rigid material may include natural or artificial polymers such as plastics, rubber products, and the like, in block, layered, or rigid foam forms. Substantially rigid material may include composite materials such as fiberglass. Substantially rigid material may include ceramic materials such as tile or brick. Substantially rigid material may include metal. Substantially rigid material may include masonry. Substantially rigid material may include concrete.

At least a second material may include flexible material. Flexible material may include any flexible material suitable for use in flooring. Flexible material may include, without limitation, flexible polymers in block, sheet, or layered forms. Flexible material may include textile or fiber mat material. Flexible material may include flexible foam. At least a second material may include elastic materials. Elastic materials may include any elastic materials suitable for use in flooring. Elastic materials may include wood battens, for instance in a basket-weave pattern. Elastic material may include elastic polymers such as natural or artificial rubber material, silicone, and the like. Elastic material may include springs, such as metal leaf or coiled springs. Elastic material may use gas as an elastic material; for instance, elastic material may include closed cells, such as closed neoprene cells. At least a second material may include one or more non-Newtonian materials as described above.

Figure 2B:
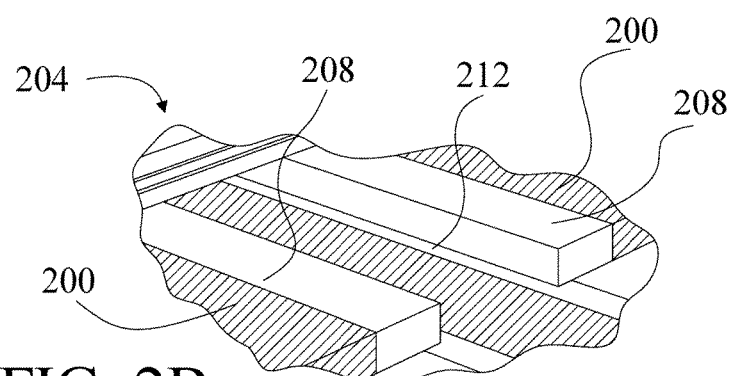
FIG. 2B is a perspective view of an exemplary detail of a flooring system in accordance with an embodiment.
Figure 2C:
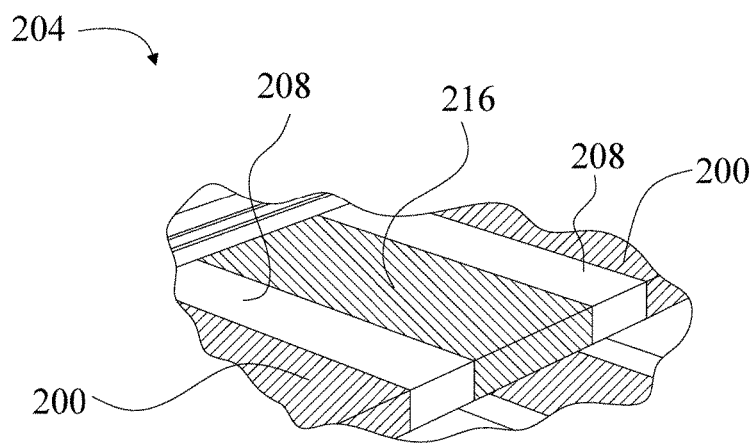
FIG. 2C is a perspective view of an exemplary detail of a flooring system in accordance with an embodiment.

At least a second material may include any combination of the above-described materials. As illustrated for example in FIG. 2B, at least a second material may include a first portion 208 composed of substantially rigid material and a substantially void second portion 212; for instance, the at least a second material may include blocks or stacks of rigid material such as plywood with voids between them. As illustrated in FIG. 2C, at least a second material may include a first portion 208 of substantially rigid material and a second portion 216 of a different material. The different material may be substantially elastic material. The different material may be substantially flexible material. Although these combinations are shown in FIGS. 2A-C as being arranged side-by-side, in some embodiments first portion 208 and second portion may be arranged vertically; for example, first portion 208 may be on top of second portion or vice versa. As a non-limiting example, second section may include a plate of rigid material supported on elastic feet. A strip of one material may be laid on top of or embedded in a portion of another material. A plurality of first portions 208 and/or second portions 212, 216 may be present in each section of at least a second material; for example, a section of at least a second material may include one or several rigid portions combined with any combination of voids, flexible material, and elastic material.

Still referring to FIG. 2C, at least a second material may include intermixed materials of two or more types. For instance, elastic and non-elastic flexible materials may be mixed together in a portion of at least a second material; as a non-limiting example, elastic fibers may be inserted or woven through an inelastic flexible material. Rigid and flexible or elastic pieces may be mixed together. Any material may be impregnated, woven, or intermixed with non-Newtonian material according to any method described above.

Returning to FIG. 2A some sections of plurality of sections of first material 200 and plurality of sections of at least a second material 204 may overlap. For instance, in some embodiments, a portion of at least a section of plurality of sections of at least a second material overlaps with at least one section of plurality of sections of first material. Overlapping portions of the at least a section of plurality of sections of second material and at least a section of the plurality of sections of first material 200 may have any form, including flanges, combinations of grooves and projecting ridges, combinations of recesses and protrusions, teeth, and the like. Overlapping portions may run the length of sections or may run only for a portion of sections.

Still viewing FIG. 2A, although in the above discussion first material is included in sections alternating with sections of at least a second material 204, first material and at least a second material may be combined in the at least a first layer in any other suitable way. For instance, at least a second material may be impregnated with first material, forming a composite as described above. Similarly, fibers of first material, such as non-Newtonian material-impregnated fibers or fibers made of non-Newtonian material, may be woven into at least a second material.

As a further example, and still viewing FIG. 2A, at least a second layer may include a plurality of sublayers. Plurality of sublayers may include alternating layers of first material and at least a second material; for example, a sublayer made up substantially entirely of at least a second material may be sandwiched between two sublayers made up substantially entirely of first material. In an embodiment, plurality of sublayers includes at least a first layer and at least a second layer. A non-limiting example of sublayers is illustrated in FIG. 2A, including three sublayers: a first sublayer 220, a second sublayer 224, and a third sublayer 228. First sublayer 220 is an upper layer for second sublayer 224 and third sublayer 228, and second sublayer 224 represents an upper layer for third sublayer 228 and lower layer for first sublayer 220. Third sublayer 228 represents a lower layer for first sublayer 220 and second sublayer 224. First sublayer 220, second sublayer 224, and third sublayer 228 are described here only for illustrative purposes, and not to limit the scope of this disclosure in any way. Plurality of sublayers may include two sublayers or more than three sublayers. Furthermore, sections and combinations of first material and second material may have any form consistent with this disclosure.

In an embodiment, with continued reference to FIG. 2A, upper layer includes a plurality of sections of the first material and a plurality of sections of at least a second material 204. Plurality of sections of first material 200 may have any form or composition described above. Plurality of sections of second material may have any form or composition as described above. Lower layer may also include a plurality of sections of the first material and a plurality of sections of at least a third material; plurality of sections of at least a third material may have any form or composition suitable for the form or composition of plurality of sections of at least a second material 204 in upper layer. As an exemplary illustration, upper layer may be first sublayer 220 and lower layer may be second sublayer 224. In some embodiments, each of plurality of sections of first material 200 in lower layer is substantially directly under a section of plurality of sections of at least a second material 204 in the upper layer, and each of plurality of sections of at least a third material in lower layer is substantially directly under a section of the plurality of sections of first material 200 in the upper layer. As an illustration, and without limitation, upper layer may be first sublayer 220 and lower layer may be second sublayer 224, in FIG. 2A; continuing the example, plurality of sections of first material 200 in upper layer may be plurality of sections 200 of first material in first sublayer 220, and plurality of sections of at least a second material 204 in upper layer may be plurality of sections 204 of at least a second material in first sublayer 220, while plurality of sections of first material 200 in lower layer may be plurality of sections of first material 200 in second sublayer 224 and plurality of sections of at least a third material in lower layer may be plurality of sections of at least a second material 204 in second sublayer 224. Sections of first material 200 in upper layer may overlap sections of first material 200 in second layer In an embodiment, and still referring to FIG. 2A, each of the plurality of sections of first material 200 in the lower layer is substantially directly under a section of the plurality of sections of first material 200 in the upper layer, and each of the plurality of sections of at least a third material in the lower layer is substantially directly under a section of the plurality of sections of at least a second material 204 in the upper layer. As a non-limiting illustration, in FIG. 2A, upper layer may be second sublayer 224 and lower layer may be third sublayer 228; continuing the example, plurality of sections of first material 200 in upper layer may be plurality of sections 200 of first material in second sublayer 224, and plurality of sections of at least a second material 204 in upper layer may be plurality of sections 204 of at least a second material in second sublayer 224, while plurality of sections of first material 200 in lower layer may be plurality of sections of first material 200 in third sublayer 228 and plurality of sections of at least a third material in lower layer may be plurality of sections of at least a second material 204 in third sublayer 228. Sections of first material 200 in upper and lower layers may be fused together, or may be discrete. Furthermore, sections of at least a second material 204 and sections of at least a third material may be fused or discrete; sections of at least a second material 204 and sections of at least a third material may be identical or different either in form or composition. As a non-limiting example, sections of at least a second material 204 may include substantially rigid material while sections of at least a third material may be voids.

Still viewing FIG. 2A, plurality of sections of first material in upper layer may include a plurality of strips, such as substantially rectangular strips, laid at a first angle in the horizontal plane, and plurality of sections of first of material in lower layer may include a plurality of strips, which may also be substantially rectangular, laid a second angle in the horizontal plane. As a non-limiting example, lower layer may include a series of strips of material installed diagonally with respect to a long dimension of a room at an angle of 30 degrees. Continuing the example, upper layer may include a series of strips of material installed diagonally at a 45-degree angle with respect to the long dimension of the room. As the result, the angles of the strips in the upper and lower layers may be offset from one another; in some embodiments, this enables the damped elastic response of the floor to be uniform, as the overlap between sections of different layers causes each point on flooring system 100 to have approximately the same amount of elasticity and damping as each other point. Angles of strips or angles of alignment of sections in at least a first discrete layer 104 may differ from an angle of alignment of at least a second discrete layer 108; for instance, where at least a second discrete layer 108 includes a wear layer made up of cleated or otherwise combined boards, at least a second discrete layer 108 may be laid with longitudinal direction of boards in a direction perpendicular to a direction in which elements in one or more layers of at least a first discrete layer 104 are laid.

Figure 3:
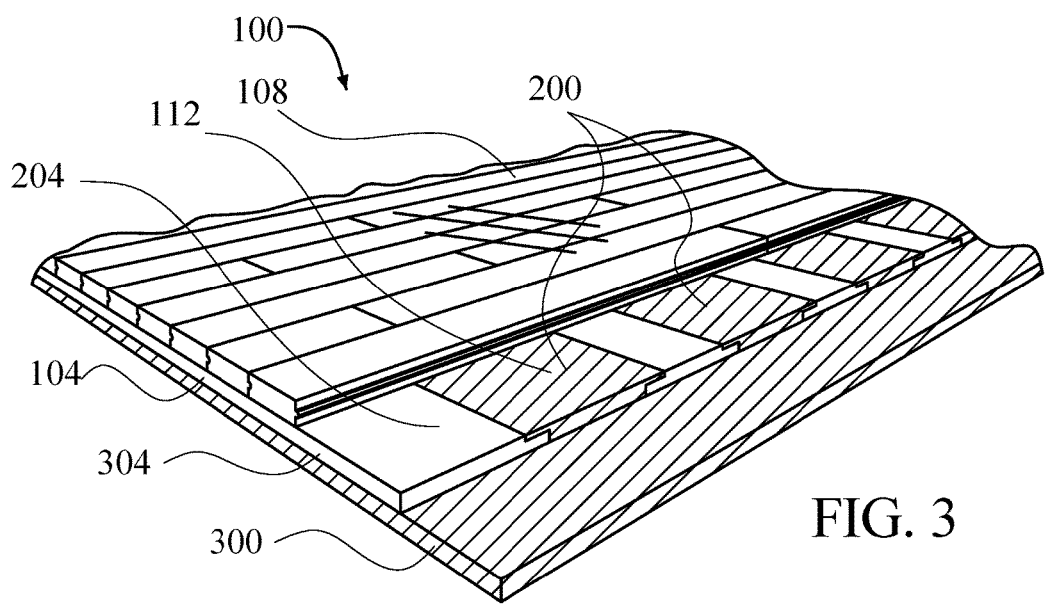
FIG. 3 is a perspective view of an exemplary flooring system in accordance with an embodiment.

In an embodiment, as illustrated for example in FIG. 3, substantially all of lower layer is made of first material. For instance, upper layer 300 may have a plurality of sections of first material 200 and a plurality of sections of at least a second material 204, while substantially all of lower layer 304 is made up of first material. Additional layers may be included above upper layer 300, below lower layer 304, or between upper layer 300 and lower layer 304; additional layers may include any combination of first material and/or at least a second material described above.

Figure 4:
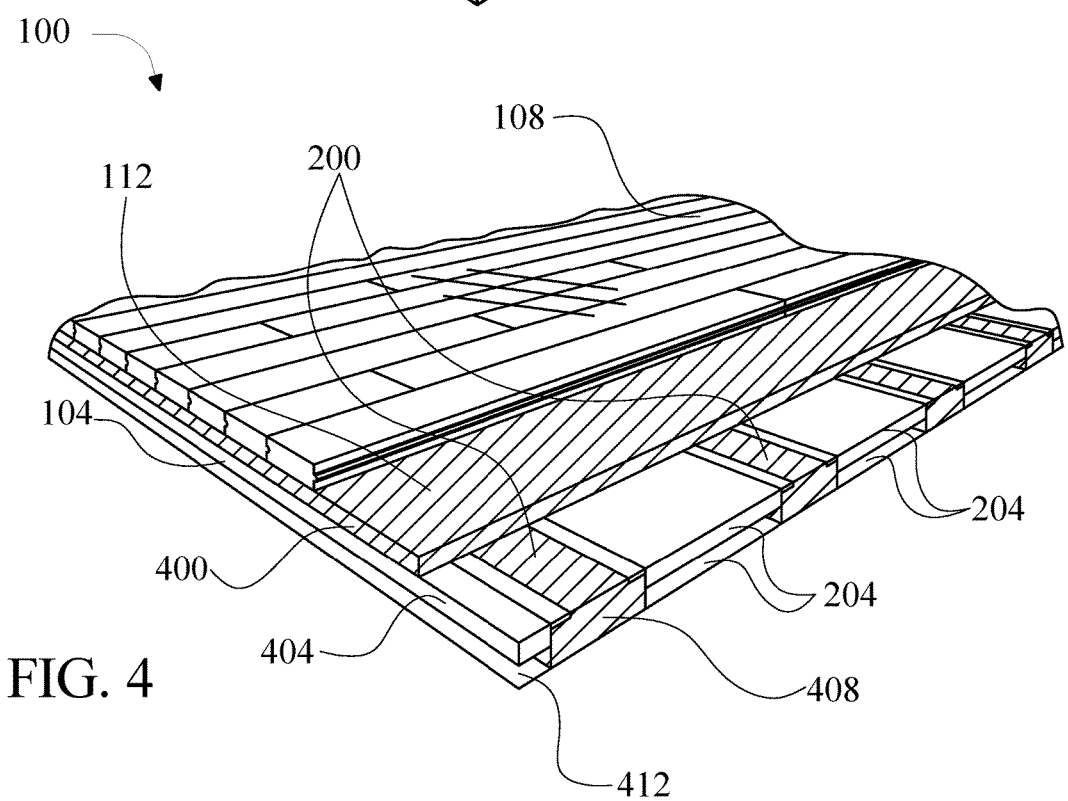
FIG. 4 is a perspective view of an exemplary flooring system in accordance with an embodiment.

In an embodiment, as illustrated for example in FIG. 4, substantially all of upper layer 400 may be made of first material. Lower layer 404 may have any form and composition described above for any sublayer; for instance, lower layer 404 may include a plurality of sections of first material 200 and a plurality of sections of second material. Lower layer 404 may also be substantially all made up of first material. Additional sublayers may be included in at least a first discrete layer 104, including sublayers above upper layer 400, below lower layer 404, or between upper layer 400 and lower layer 404. For instance, as depicted in FIG. 4, an additional layer 408 may be disposed below lower layer 404, which may have any form and/or composition described above for any sublayer.

Incorporation of dilatant material in a flooring system 100 as described above may have several distinct advantages. Because stiffness, viscosity, and other resistance to shear deformation and shear force increases in dilatant material as shear rate increases, damping factors of damped elastic systems incorporating dilatant material increase non-linearly with speed of impact or amplitude of vibration. As a result, greater amplitudes of vibration and higher-kinetic energy impulses are subject to much stronger damping, causing a very strong dissipation of energy and rapid decline in vibrational amplitude. In experiments comparing dilatant damping material installed in flooring systems to conventional damping material installed in comparable flooring systems, it was found that dilatant material comprising approximately half the thickness and overall volume of conventional material produced damping at a rate that was comparable or superior to the damping rate yielded by the conventional material. The non-linear nature of dilatant damping suggests that for higher impacts the improved performance of dilatant material would be even more pronounced. A flooring system 100 as disclosed above may produce equal or better performance to conventional flooring systems with much smaller and lighter assemblies, or with assemblies using space freed up by relatively thin dilatant damping materials to improve ventilation, temperature control, or other factors in maintaining high-quality flooring systems.

It should be noted that the above examples are presented for illustrative purposes only, and are not meant to limit the scope of this disclosure in any way. For instance, at least a first discrete layer 104 may include more than three sublayers or fewer than two sublayers. Furthermore, at least a first discrete layer 104 may include one or more layers containing no first material at all, such as a layer of plywood or other rigid material above, below, or between sublayers; as another example, a layer made up entirely of elastic material may be above, below, or between sublayers. Any two sublayers as described above may be adjacent or separated by one or more additional sublayers. Furthermore, sections 200 including first material in upper layer may have varied positions relative to sections 200 of first material in lower layer in an embodiment.

It is also contemplated that different non-Newtonian materials may be used in different regions of at least a first discrete layer 104, providing a way to further adjust the response of flooring system 100; different thicknesses or breadths of first material may also be used in different sections or sublayers of at least a first discrete layer 104, enabling further adjustment of response by flooring system 100 to expected ranges of impacts.

Materials making up at least a first discrete layer 104 may be allowed to rest on each other without attachment; alternatively, materials may be fastened together or to a substrate beneath flooring system 100 using one or more fasteners (not shown). One or more fasteners may include without limitation bolts, studs, rivets, screws, nails, staples, adhesives, drive pins such as collared steel drive pins, or any other suitable fasteners. Sections or sublayers of first material, at least a second material, or at least a second material may have reciprocating parts that may be used to attach one section or sublayer, including cleats, tab-and-groove arrangements, or other interlocking parts.

Referring again to FIG. 1, at least a first discrete layer 104 may be a subfloor. In an embodiment, a subfloor is a portion of a floor on which a wear layer of the floor rests. A subfloor may include any elements as described above for inclusion in at least a first discrete layer, including without limitation one or more sections of rigid material, one or more sheets of rigid material such as plywood, one or more elastic elements, one or more damping elements including without limitation at least a portion 112 of first material, one or more voids, heating elements, tubes, wires, ducts, or any other item that may be inserted under wear layer. Subfloor may have plywood sheathing above and/or below subfloor with additional elements sandwiched between plywood sheathing; where subfloor includes elastic or damped elastic "feet" or strips of material on which the remainder of subfloor rests, a lower layer of plywood sheathing may rest on top of the feet or strips of material. A layer of sheathing may include two or more sublayers having overlapping edges; edges may overlap by 11 inches or more; the overlapping edges may enhance the stability of the sheathing. Any layer of subfloor may include expansion voids; in an embodiment, an expansion void is a void into which a section or portion of a layer or sublayer may expand owing to changes in humidity or temperature, preventing the layer or sublayer from buckling or seizing, and in turn preventing damage or irregularity in the flooring system 100. Expansion voids may be located at edges of subfloor, or of flooring system as a whole; for instance, a void may be present between flooring system 100 and boundaries such as walls, posts, doors, equipment sleeves, and the like. Subfloor may include one or more areas of solid blocking where substantially all of a vertical section of subfloor is rigid to support weight of a heavy object; for instance, solid blocking may be present at doorways, under bleachers that are stacked, and below portable goals. Subfloor may be anchored to a substrate as described below.

Still referring to FIG. 1, athletic flooring system 100 includes at least a second discrete layer 108. At least a second discrete layer 108 may include a wear layer; a wear layer may be a layer on which people walk. At least a second discrete layer 108 may include a performance surface. In an embodiment, a performance surface may be a surface that athletes or dancers contact during performance; a performance surface may be a form of wear layer. Wear layer or performance surface may be composed of any suitable material. In some embodiments, wear layer or performance surface is made of materials including wood. For instance, wear layer or performance surface may be assembled out of boards of hardwood, which may be attached together using cleats, staples, or other suitable means. Wear layer or performance surface may be made of plywood or engineered wood. Wear layer or performance surface may alternatively be made of vinyl or other polymer, which may be rolled on in one or more sheets or poured on in liquid form and allowed to cure. At least a second discrete layer 108 may include a track surface, for instance a surface made of textured or smooth elastic material such as natural or artificial rubber, as described in further detail below. At least a second discrete layer 108 may include turf, as described in further detail below. At least a second discrete layer 108 may include more than one kind of athletic or performance surface, as set forth in further detail below.

With continued reference to FIG. 1, wear layer or performance surface may be finished; for instance, wear layer or performance surface may include a layer of varnish, polyurethane, wax, or other finishing material. In an embodiment, finishing material may impart a required degree of static friction, dynamic friction, or both to surface of performance surface or wear layer. Wear layer or performance surface may include one or more lines or other indicia such as foul lines, boundaries, foul-shooting lines, three-point shooting lines, numbers, letters, team logos and the like. Indicia may be above or below finish.

Still referring to FIG. 1, at least a second discrete layer 108 may include one or more layers that combine different materials together. For instance, at least a second discrete layer 108 may include a non-Newtonian material, which may be combined with any other material described above, including rigid, flexible, or elastic materials. Materials may be combined in any manner described above in any layer of at least a second discrete layer 108.

Continuing to refer to FIG. 1, at least a second discrete layer 108 may include multiple layers. For instance, and without limitation, at least a second discrete layer 108 may include a wear layer and a second layer (not shown) beneath wear layer; for instance, wear layer may be wood boards fastened together, and second layer may be a layer of plywood.

In an embodiment, and still referring to FIG. 1, at least a second discrete level displays elastic properties. For instance, at least a second discrete layer 108 may display area elastic properties. In some embodiments, a surface of a floor may display area elastic properties where a region of the surface surrounding an impact is displaced by elastic deformation in response to the impact. A wood surface or similarly stiff surface may exhibit area elastic properties. At least a second discrete layer 108 may be point elastic, where only the point of impact is displaced by the impact, leaving the surrounding area relatively stable. As a non-limiting example, at least a second discrete level may include a polymer, textile, or rubber surface that exhibits point-elastic behavior.

In an embodiment, and continuing to refer to FIG. 1, at least a first discrete layer 104 is disposed beneath the at least a second discrete layer 108. At least a first discrete layer 104 may act to enhance the area elasticity of at least a second discrete layer 108. This may occur due to the nature of first material in at least a first discrete layer 104. For example, where first material is dilatant, an impact tending to distort the at least a second discrete layer 108 at a single point may concentrate the force of impact at that point. As a result, a high shear rate may be induced in first material beneath the point of impact, causing first material to behave as a rigid solid; this in turn may cause first material to press down on a wider region of at least a first discrete layer 104, which may deform across a wider area. Where nearby portions or lower sublayers in at least a first discrete layer 104 also contain first material, relatively high shear rates may tend to propagate further outward; thus, for higher energy impacts which might normally give rise to point-elastic behavior in a conventional sprung floor, flooring system 100 may spread the force of impact further out, enhancing area elasticity in response to the greater shear displacement rate induced by the higher energy impact. This may be used to achieve area elasticity in roll-out floors such as linoleum or other polymer surface floors, enabling the manufacture of such floors to mimic the behavior of wooden flooring with a much thinner, easily portable flooring system. The relative amounts and locations of first material in a flooring may be used to adjust the behavior of the flooring system along a continuum from point elasticity to area elasticity; for example, a point elastic floor may have a first sublevel in at least a first discrete layer 104 that is conducive to point elasticity, with a relatively small amount of first material, and a second, lower sublevel with a greater concentration of first material, so that a powerful impact gets distributed by the extremely stiffened first sublayer and the second sublayer in a manner consistent with area elasticity, while a lighter impact or pressure causes elasticity in the first sublayer to predominate, permitting point-elastic behavior.

With continued reference to FIG. 1, on-Newtonian first material may confer additional advantages. Where first material is a dilatant material, higher shear rates induced by higher amplitude oscillations may cause first material to stiffen further, increasing overall damping of oscillation, and particularly resisting movement of oscillation at points during which oscillation is at peak kinetic energy, and therefore peak velocity; this may dampen oscillation to a negligible level far more rapidly for a given quantity of damping material, permitting first material to be used in smaller amounts than conventional damping material. As a result, flooring system 100 may be built using less overall quantities of material, improving cost-effectiveness of construction. Furthermore, flooring system 100 at a given thickness may be more effective at damping oscillation and providing an optimal elastic response to athletic motion.

Still referring to FIG. 1, a further advantage may be a greater range of optimal response by flooring system 100 as compared to conventional flooring systems. Thickness and distribution of first material throughout at least a first discrete layer 104 may be selected to achieve an optimal degree of damping given the elasticity of other elements in flooring system 100; this optimal degree may be selected for a typical impact force, such as a median or average impact force given the intended use of flooring system 100. In contrast to conventional flooring systems, however, higher-energy or faster impacts may increase the momentary damping ability of first material, thus continuing to damp impact at an optimal rate, where first material is dilatant; lighter impacts may result in a more softened first material, decreasing the damping effect, and again extending the range of impacts through which flooring system 100 responds optimally. Consequently, flooring system 100 may produce superior performance for a greater range of athletes and other performers, permitting broader and safer use of flooring system 100 than conventional athletic flooring would allow.

Continuing to refer to FIG. 1, at least a second discrete layer 108 may rest on top of at least a first discrete layer 104. In some embodiments, at least a second discrete layer 108 is not attached to at least a first discrete layer 104; alternatively, at least a second discrete layer 108 may be secured to at least a first discrete layer 104 by any means described above for securing sublayers of at least a first discrete layer 104 together.

With continued reference to FIG. 1, flooring system 100 may rest on a substrate (not shown). Substrate may include any surface on which an athletic floor may be constructed, including without limitation concrete, floor joists, steel, masonry, earth, or any other building material. Flooring system 100 may rest on substrate without further attachment; alternatively, flooring system 100 may be attached to substrate by any means described above for securing sublayers of at least a first discrete layer 104 together. Substrate may include a concrete slab, which may be installed according to applicable standards of humidity, levelness, and quality. As a non-limiting example, concrete slab may be trawled smooth. Concrete slab may be leveled to a specified tolerance, inspected, and otherwise subjected to quality control to ensure that substrate is adequately able to support flooring system 100. Substrate may be made of any suitable material or combination of materials, including floor joists, packed earth, metal, or other materials.

Still referring to FIG. 1, flooring system 100 may include additional layers. Additional layers may include a vapor barrier 412, which may limit passage of moisture from substrate to floor or vice-versa, enabling regulation of humidity of flooring system 100. Vapor barrier 412 may be constructed of any material impermeable or semi-impermeable to moisture, including without limitation polyethylene film. Vapor barrier 412 may be disposed on substrate beneath flooring system 100. Vapor barrier may be created by "vapor proofing" concrete slab. For instance, and without limitation, vapor barrier may be created by deposition of multi-cellular, linear linked, closed cell polyethylene foam, which may be sealed together using waterproof or moisture-resistant attachment means such as duct tape.

Figure 5A:
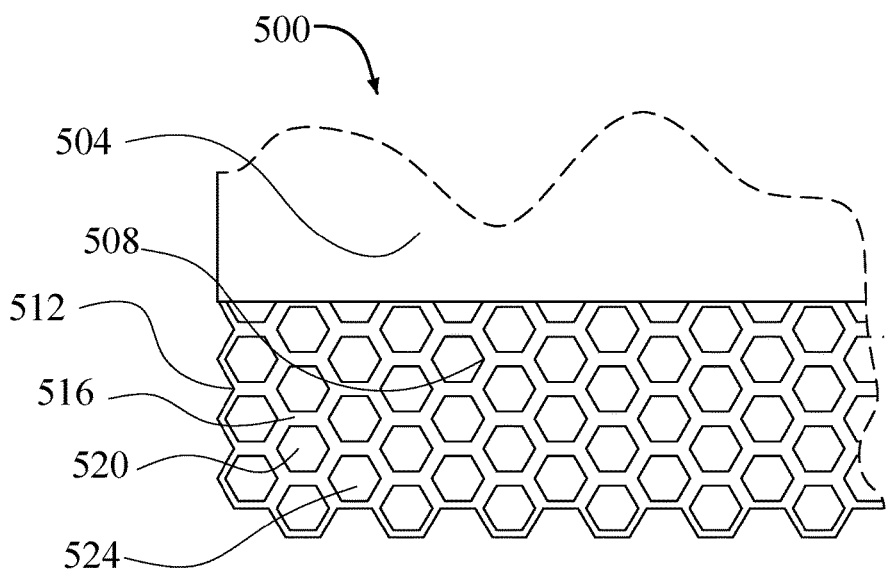
FIG. 5A is a top view of an exemplary flooring system in accordance with an embodiment.
Figure 5B:
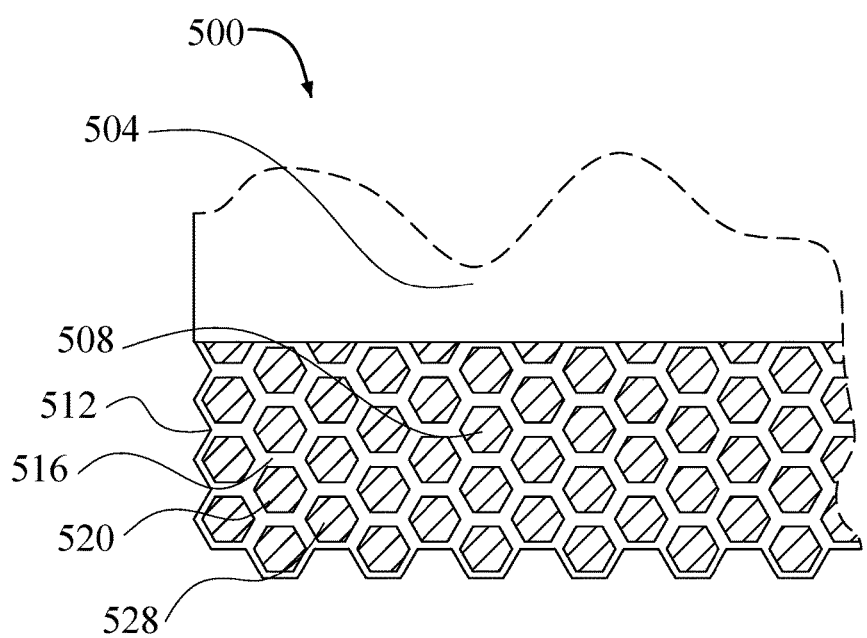
FIG. 5B is a top view of an exemplary flooring system in accordance with an embodiment.

Now referring to FIGS. 5A-B, a top view is shown of an exemplary embodiment of flooring system 500 including a top layer 504 and bottom layer 508. Top layer 504 in this example may be a track surface for indoor or outdoor track events such as racing, hurdling and the like. Top layer 504 may have a roughened texture for improved traction, or may include a surface with a high coefficient of static friction to achieve the same result. Top layer 504 may include an elastic material such as vulcanized or non-vulcanized synthetic or natural rubber, or another material with similar properties; in an embodiment, this material may create a slightly cushioning, slightly elastic effect conducive to running and jumping performance and injury prevention in track sports. Top layer 504 may include first material, which may be incorporated in top layer 504 as a sublayer above or below elastic material, or blended with elastic material; in other words, flooring system 500 may be a flooring system 100 as described above, in which top layer 504 is at least a first discrete layer 104. Any other material described above for flooring system 100 may be used for top layer 504, in any isolated or combined form as described above for flooring system 100.

Continuing to refer to FIGS. 5A-B, bottom layer 508 may include a geometrically patterned array 512 of material. Geometrically patterned array 512 may include a series of repeating geometric forms; geometric forms may include substantially polygonal forms such as hexagonal, rectangular, or square forms, which may be irregular or regular. Geometric forms may include substantially curved forms, such as circular, elliptical, s-curved or other curved forms; geometric forms may combine curved and polygonal features. In an embodiment, geometrically patterned array 512 has varying thickness. Thickness may vary in a regular pattern throughout geometrically patterned array 512; for instance, portions of geometrically patterned array corresponding to outlines 516 of geometric figures may be raised, as shown in FIG. 5A, or depressed, relative to the remainder of geometrically patterned array 512. Raised outlines 516 may form ridges or walls, while the remainder of geometrically patterned array forms one or more depressions 520; outlines may be interconnected. Depressions 520 may have the same geometric form as outlines 516; for example, geometrically patterned array may resemble a cross-section of honeycomb with interconnected hexagonal walls 516 around hexagonal depressions 520. Depressions 520 may have different geometric forms from outlines 516; thus, the geometrically patterned array 512 may have substantially hexagonal outlines 516 about circular depressions 520 or depressions 520 having other curved, polygonal or hybrid forms. Persons skilled in the art, upon reading the entirety of this disclosure, will be aware of many other potential combinations of geometric figures for depressions 520 and outlines 516. Moreover, analogous variations where outlines are depressed and space between outlines is raised are also considered to be within the scope of this disclosure. Depressions 520 may extend the entire thickness of geometrically patterned array 512 or may extend only partway through the thickness of the geometrically patterned array 512. Bottom layer 508 may include additional layers (not shown) above or below geometrically patterned array 512. Geometrically patterned array 512 may extend through substantially all of a layer, or may extend through part of a layer, with other portions of layer having different forms or patterns.

Still referring to FIGS. 5A-B, bottom layer 508 may be formed of any material or combination of materials suitable for formation of any portion of flooring system 100 as described above. Geometrically patterned array 512 may be formed of any material or combination of materials suitable for any portion of flooring system 100 as described above. Outlines 516 may be formed of any material or combination of materials suitable for any portion of flooring system 100 as described above. As a non-limiting example, outlines 516 may be formed of material including an elastic material, such as a solid elastic polymer or an elastic polymer foam. Outlines 516 may include non-Newtonian material, which may be any non-Newtonian material as described above. Non-Newtonian material may be a dilatant material; for instance, Non-Newtonian material may be first material. Thus, flooring system 500 may be a flooring system 100 as described above wherein the at least a first discrete layer 104 is bottom layer 508 or the sublayer thereof containing geometrically patterned array 512. Persons skilled in the art will be aware, upon reading the entirety of this disclosure, that where both top layer 504 and bottom layer 508 contain first material, either the top layer 504 or the bottom layer 508 may be viewed as constituting the at least a first discrete layer 104.

With continuing reference to FIGS. 5A-B, non-Newtonian material and elastic material may be combined together in outlines 516, geometrically patterned array 512, or any other part of bottom layer 508 in any manner described above, including as distinct or intermixed sublayers, or as a blend. As a non-limiting example, outlines 516 may be composed wholly or in part of a combined foam of elastic and non-Newtonian material; for instance, where non-Newtonian material is first material, first material in foam may act to damp elastic response of elastic material in foam as described above.

Depressions 520 may be voids 524: that is, depressions 520 may contain substantially nothing but air, as shown for example in FIG. 5A. Alternatively, depressions 520 may be partially or wholly filled with an additional material 528, as shown for instance in FIG. 5B. Additional material 528 may be any material or combination of materials described in this disclosure as suitable for any flooring system or component thereof. As a non-limiting example, outlines 516 may be composed of substantially elastic material, while depressions 520 are wholly or partially filled with an additional material 528 having damping properties; additional material 528 may be non-Newtonian, and may include first material as described above. Flooring system 500 may include additional layers (not shown) which may have any form or material composition suitable for any layer or sublayer of any flooring system described in this disclosure.

Still referring to FIGS. 5A-B, flooring system 500 may be deployed on a substrate as described above. Flooring system may be deployed outdoors or indoors, for instance as an elliptical or ellipsoidal track with or without straightaways for racing, laps, and other athletic or recreational use. Flooring system 500 may be seen as any track flooring incorporating a non-Newtonian material. Flooring system 500 may be seen as any track flooring incorporating a dilatant material. In an embodiment, incorporation of dilatant material in flooring system 500 permits vibration control even in thin track surfaces owing to the non-linear damping of dilatant material. Dilatant material in flooring system 500 may also aid in injury reduction as the increased rigidity of dilatant material in response to greater impacts may cause the force of impact to be spread out across a wider area, so that more elastic material is involved in absorption of the force; this may reduce the proportion of the force that is absorbed by direct impact against a hard underlying substrate, and lessen the chance of injury resulting from falls. In an embodiment, inclusion of dilatant material in flooring system 500 decreases join wear & tear, fatigue, and/or impact on bodily parts or other items including machinery or equipment.

Figure 6:
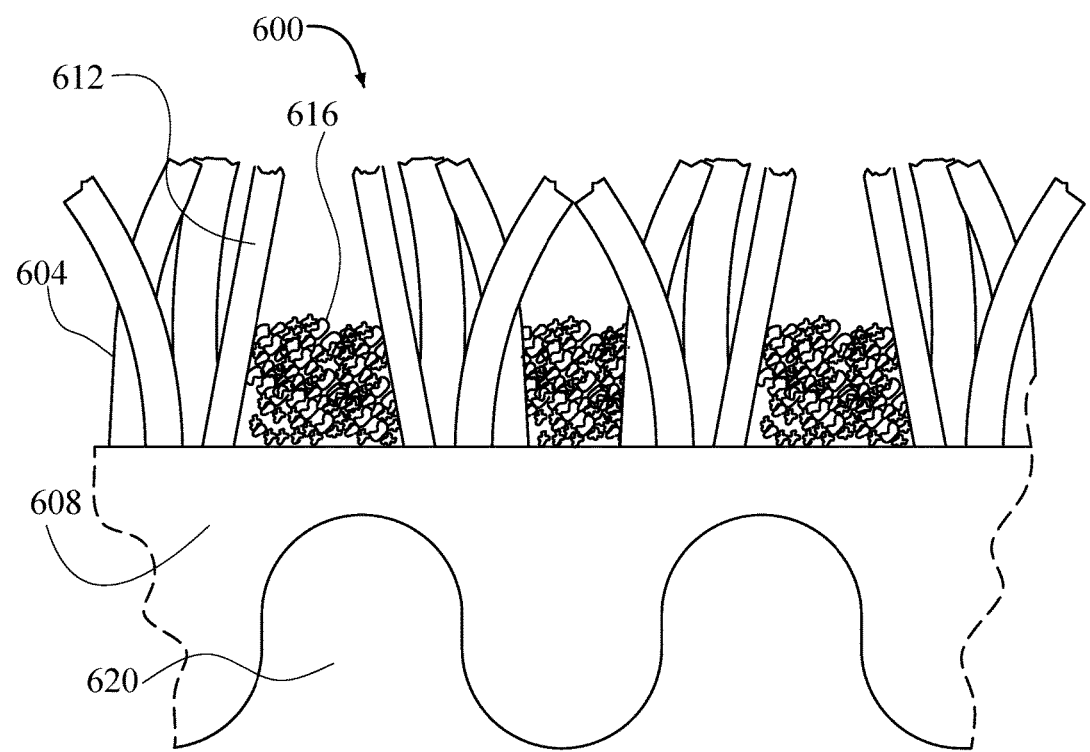
FIG. 6 is a cross-sectional view of an exemplary turf flooring system in accordance with an embodiment.

Now referring to FIG. 6, an exemplary embodiment of a turf flooring system 600 is illustrated in cross-section. Turf flooring system 600 includes a top layer 604 and a bottom layer 608. Top layer 604 may include one or more flexible members 612; in an embodiment, one or more flexible members 612 may be formed to imitate a grassy surface, such as those found on natural athletic playing fields, including without limitation soccer fields, football fields, baseball fields, cricket pitches, golf courses, tennis courts, and fields used for track events such as javelin and shot put. Flexible members 612 may have any form suitable for use on artificial turf surfaces. Flexible members 612 may be shaped substantially like blades of grass, including unmown grass or grass mown to various lengths. Flexible members 612 may be elongated, with length significantly exceeding width. Flexible members 612 may be flattened. Flexible members 612 may be composed of any suitable flexible material including natural or synthetic polymer sheets, any natural or synthetic fiber-based material such as textile or fiber mat material, or any combination of flexible materials usable in artificial turf. Flexible members 612 may include non-Newtonian material, including dilatant, pseudoplastic, thixotropic or rheopectic material. Non-Newtonian material may be incorporated in flexible members 612 in any form and by any means described within this disclosure. In some embodiments, turf flooring system 600 is a flooring system 100 as described above; for instance, top layer 600 may be at least a first discrete layer 104.

Still referring to FIG. 6, top layer 604 may include fill 616. Fill 616 may be a mass of material designed to simulate physical properties of a grass and sod surface. Fill 616 may include, without limitation, a plurality of particles of varied or uniform shape. Plurality of particles may include sand, such as silica sand. Plurality of particles may include particles composed of any materials described above, or any combination of materials described above, including without limitation combinations formed in manners described above. Plurality of particles may include particles composed of elastic material, such as vulcanized or non-vulcanized natural or synthetic rubber or other plastic polymer material. Plurality of particles may include non-Newtonian material, including without limitation dilatant material, pseudoplastic material, rheopectic material, or thixotropic material. Non-Newtonian material may be combined in individual particles with elastic material. Fill 616 may include a plurality of particles of elastic material and non-Newtonian material. Where fill 616 is a mass other than particles, fill 616 may include layers of elastic and non-Newtonian material, intermixed non-Newtonian and elastic material, fibers of or impregnated with non-Newtonian material embedded into or woven with elastic material, or any other suitable means of combination. The collective effect of combining elastic material and non-Newtonian material by any of the above means may be to produce a damped elastic effect in fill 616; non-Newtonian material may give the fill 616 vibration control and impact absorption properties similarly to those conferred on other flooring systems as described in this disclosure. In an embodiment, other damping materials are combined with elastic material in fill 616, either instead of or in combination with non-Newtonian material.

Continuing to refer to FIG. 6, top layer 604 may include additional elements (not shown), such as a binding layer that connects together flexible members 612 at base ends of flexible members 612, for instance to simulate the root system securing in place blades of grass. Binding layer may be composed of any combination of flexible, elastic, or non-Newtonian material, including without limitation textile, sheets of natural or synthetic polymer material, and the like. Non-Newtonian material may be incorporated in binding layer according to any method described in this disclosure for the incorporation of non-Newtonian material in any component. Flexible members 612 may be attached to binding layer by any suitable means including adhesion, stitching, or any other means usable to attach flexible members or fibers to sheets of material.

Still referring to FIG. 6, bottom layer 608 may be composed of any materials describe in this disclosure, including without limitation elastic material, such as elastic foam or solid masses of elastic polymer material. Bottom layer may include non-Newtonian material, including without limitation dilatant material. Non-Newtonian material may be incorporated with other materials in bottom layer 608 according to any means described for incorporating non-Newtonian material in any component in this disclosure. As a non-limiting example, bottom layer 608 may include at least a layer of combined elastic and dilatant foam, which may provide a damped elastic response to deformation; damping by dilatant material may confer any or all advantages described in this disclosure for using dilatant material to damp elastic response or absorb impact. Bottom layer 608 may include one or more voids 620, which may aid in regulating elastic response, damped elastic response, or ventilation of flooring system 600. Persons skilled in the art will understand, upon reviewing the disclosure in its entirety, that flooring system 600 may be an embodiment of flooring system 100: where top layer 604 includes dilatant material, top layer 604 may be at least a first discrete layer 104. Where bottom layer 608 includes dilatant material, bottom layer 608 may be at least a first discrete layer 104. Flooring system 600 may include additional layers (not shown) which may have any form or material composition suitable for any layer or sublayer of any flooring system described in this disclosure.

With continued reference to FIG. 6 flooring system 600 may be deployed on a substrate as described above. Flooring system may be deployed outdoors or indoors, for instance as an elliptical or ellipsoidal turf with or without straightaways for racing, laps, and other athletic or recreational use. Flooring system 600 may be seen as any turf flooring incorporating a non-Newtonian material. Flooring system 600 may be seen as any turf flooring incorporating a dilatant material. In an embodiment, incorporation of dilatant material in flooring system 600 permits vibration control even in thin turf surfaces owing to the non-linear damping of dilatant material. Dilatant material in flooring system 600 may also aid in injury reduction as the increased rigidity of dilatant material in response to greater impacts may cause the force of impact to be spread out across a wider area, so that more elastic material is involved in absorption of the force; this may reduce the proportion of the force that is absorbed by direct impact against a hard underlying substrate, and lessen the chance of injury resulting from falls. In an embodiment, inclusion of dilatant material in flooring system 600 decreases join wear & tear, fatigue, and/or impact on bodily parts or other items including machinery or equipment.

Figure 7:
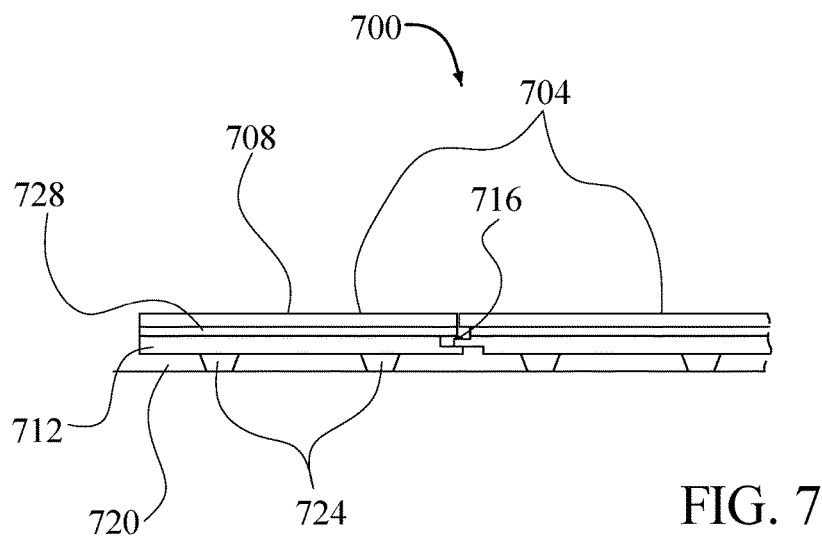
FIG. 7 is a cross-sectional view of an exemplary modular flooring system in accordance with an embodiment.

Referring now to FIG. 7, a cross-sectional view of an exemplary embodiment of a flooring system 700 is illustrated. Flooring system 700 includes a plurality of modules 704. Plurality of modules 704 may be detachably attached together, to form a portable floor that may be assembled and disassembled as needed; for instance, flooring system 700 may be a basketball floor or similar wooden flooring system that may be assembled over an ice rink for use in a basketball game or disassembled for a hockey game. Each module 704 may include a wear layer 708. Wear layer 708 may be constructed of any material or combination of materials suitable for the construction of a wear layer as described herein. As a non-limiting example, wear layer 708 may be constructed of wood, such as maple or other hardwood, which may be finished, painted with logos, lines, and other indicia. Wear layer 708 may also be composed of other materials, including materials used to make an elastic track surface, a turf surface, a polymer performance surface, and the like. Wear layer 708 may include a natural surface such as grass. Wear layer may incorporate non-Newtonian materials using any means described in this disclosure for incorporation of non-Newtonian material in a component of a flooring system.

Still referring to FIG. 7, each module 704 may include a connection layer 712. Connection layer 712 may include one or more connectors 716 to attach module 704 to neighboring modules. One or more connectors 716 may include any connectors suitable for securely fastening together modules of a portable athletic floor, including pin-and-socket connectors, latches, tongue- and groove connectors, and the like. When one or more connectors have fastened each module 704 to its neighboring modules, flooring system 700 may behave as a monolithic unit, and layers of individual modules 704, such as wear layers 708, may combine to form floor-wide layers, such as a floor-wide wear layer made up of combined wear layers 708. Connection layer 712 may be formed of any rigid material or materials including without limitation wood and metal; connection layer 712 may provide structural strength to hold together the plurality of modules 704 as a monolithic flooring system 700.

Continuing to refer to FIG. 7, each module 704 may include a base layer 720. Base layer 720 may be a layer that rests on a substrate below module 704. Base layer may include one or support structures 724 that support the module 704. Support structures 724 may be sheets, feet or strips of material. Support structures 724 may include elastic material to provide resiliency to flooring system 700, which may be in any form including blocks, sheets, or strips of elastic polymer material or elastic foam. Support structures 724 may include damping material, which may be combined with elastic material by any suitable means; for instance, support structures 724 may include vertically arranged layers of elastic and damping material. Support structures 724 may include columns or other horizontally combined sections of elastic and damping material. For example, a support structure 724 in the form of a strip or foot may have a core of one material surrounded by an envelope of another material; core may be elastic with envelope damping or vice-versa. Damping material and elastic material may be intermixed, for instance in a foam combining damping and elastic materials. Damping material may include non-Newtonian material, including without limitation dilatant material. When modules 704 are combined to form flooring system 700, base layers 720 of modules may combine to form a base layer for flooring system 700.

With continued reference to FIG. 7, each module 704 may have at least an intermediate layer 728. At least an intermediate layer 728 may be constructed using any materials, in any configuration, described for any layer of flooring system 100, including without limitation sheets of rigid material such as plywood, sheets or pads of non-Newtonian material, sheets or pads of combined non-Newtonian and elastic material, alternating sections of different materials including rigid, elastic, damping, flexible, non-Newtonian, or void sections, or sections combining two or more of any material. Flooring system 700 may be a flooring system 100 as described above; for instance, and without limitation, base layer 720 may be at least a second discrete layer 104 as described above, or intermediate layer 728 may be at least a second discrete layer 104 as described above. In some embodiments, incorporation of non-Newtonian material in each module 704 permits flooring system 700 to damp vibration more effectively than existing portable floors, using smaller quantities of damping material. For instance, incorporation of dilatant material in support structures 724 may result in significant damping of elastic response, allowing both impact absorption and vibration control to be achieved with significantly smaller or thinner support structures 724; as a result, flooring system 700 may better prevent injury and fatigue while also being more compact and light for transportation and storage. In an embodiment, inclusion of dilatant material in flooring system 700 decreases join wear & tear, fatigue, and/or impact on bodily parts or other items including machinery or equipment.

Figure 8:
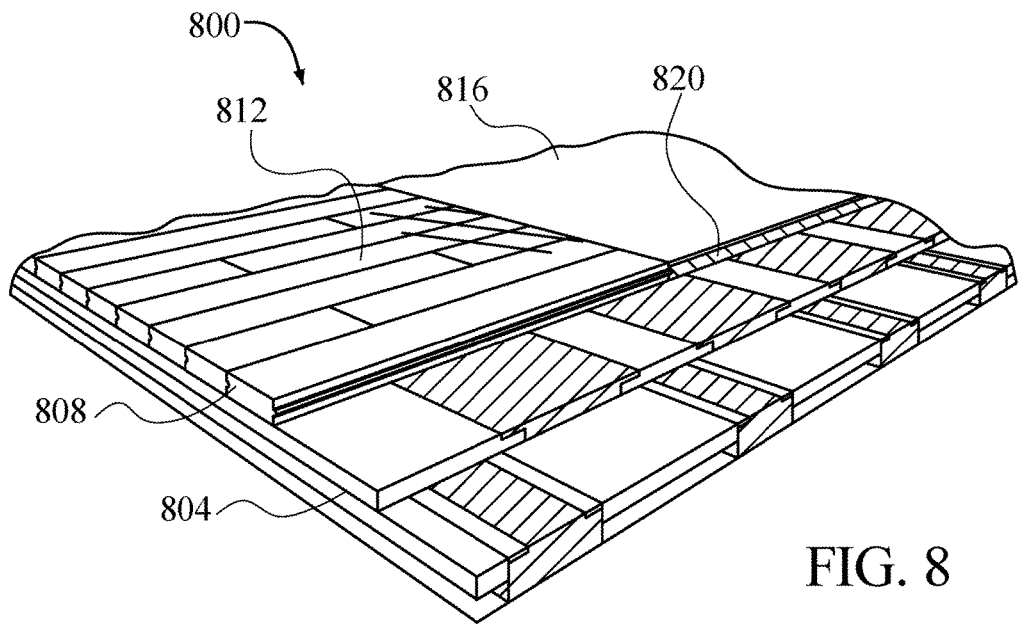
FIG. 8 is a perspective view of an exemplary hybrid flooring system in accordance with an embodiment.

Turning to FIG. 8, a hybrid floor 800 is illustrated. Hybrid floor 800 may include a subfloor 804; subfloor 804 may be constructed out of any materials in any combination described above for a subfloor or for at least a first discrete layer 104 of flooring system 100, or underlying supports of any other flooring system described above. Hybrid floor 800 may include a wear layer 808 including a first area 812 and a second layer 816; first area 812 may be constructed of different material from second layer 816. First area 812 may be constructed according to any example or embodiment disclosed herein in for a wear layer, including without limitation a track surface, an area elastic surface such as a wooden surface, a point-elastic surface such as a polymer sheet surface, or a turf surface; second area 816 may be constructed according in any manner and of any material suitable for construction of first area 812. As a non-limiting example, first area 812 may be constructed of wood flooring, such as cleated maple flooring, while second area 816 may have an elastic track surface or performance surface. Where second area 816 includes a wear layer less thick than that of first area 812, second area may have an additional support layer 820 underneath its wear layer. Additional support layer 820 may be constructed of any materials in any combination suitable for any subfloor, sublayer, base layer, or other supporting elements described herein. For instance, where second area 816 includes a top layer 504 of elastic track surface as described above in connection with FIGS. 5A-B, additional support layer 820 may be a bottom layer 508 as described above. Persons skilled in the art will be aware, after reading the entirety of this disclosure, of many possible combinations of first area 812 and second area 816 to produce a multi-use hybrid flooring system 800, whether indoors or outdoors, for a variety of uses.

Certain embodiments of an athletic flooring system incorporating a dilatant material have been described herein. Described and depicted embodiments are presented herein for illustrative purposes only, to aid in understanding the disclosed flooring system, and are not intended to limit the scope of the disclosed flooring system to the particular embodiments depicted or illustrated. Persons skilled in the art, upon reading the entirety of this disclosure, will be aware of many possible alternative ways to implement flooring system as disclosed, each of which are within the scope of this disclosure. Any version, embodiment, or example described above including any kind of non-Newtonian material in combination with or replacing any other material described as a component material of any version, embodiment, or example described above is further contemplated as within the scope of this disclosure, whether the non-Newtonian material is dilatant or shear thickening, pseudoplastic or shear-thinning, rheopectic, thixotropic, plastic, Bingham plastic, or otherwise characterized. In particular, the scope of this disclosure includes any arrangement in which first material in any component of any embodiment described above combines or replaces dilatant material with any other non-Newtonian material, including without limitation pseudoplastic or shear-thinning, rheopectic, thixotropic, plastic, Bingham plastic or other materials, Furthermore, any flooring system including a dilatant material in any way is contemplated as within the scope of this disclosure; for instance, a flooring system may include only at least a first discrete layer 104 as described above, for instance as a mat of combined elastic and dilatant materials, combined by any means described above.

It is further contemplated that non-Newtonian material may be incorporated in systems other than flooring systems as described above. As a non-limiting example, and as illustrated by a partial cutaway in FIG. 9, non-Newtonian material may be incorporated in a seating unit 900. Depicted is an intermediate layer, or core 904. Core 904 may be constructed of any rigid, flexible, elastic, or non-Newtonian material as described herein. Core 904 may be constructed of foam; foam may be flexible polymer foam, elastic polymer foam, non-Newtonian foam, or a mixture thereof. For example, core 904 may be constructed of a foam made by blending elastic and non-Newtonian materials. Core may similarly be constructed of laminated fiberglass, wood, aluminum, composite honeycomb, foam, and/or resin. The laminated fiberglass may include one or more fibers, such as, for example, carbon fibers, aramid fibers, and/or any other suitable reinforcing fibers known in the art. Non-Newtonian materials incorporated in core 904 may include impregnated fibers in the fiber glass, impregnated laminated fiberglass, inserts or fillers in gaps in composite honeycomb, foam, and/or resin mixed with shear thickening material. In other embodiments, core 904 may be a void; for instance, seating unit 900 may be made up of an exterior shell with an empty interior.

Figure 9:
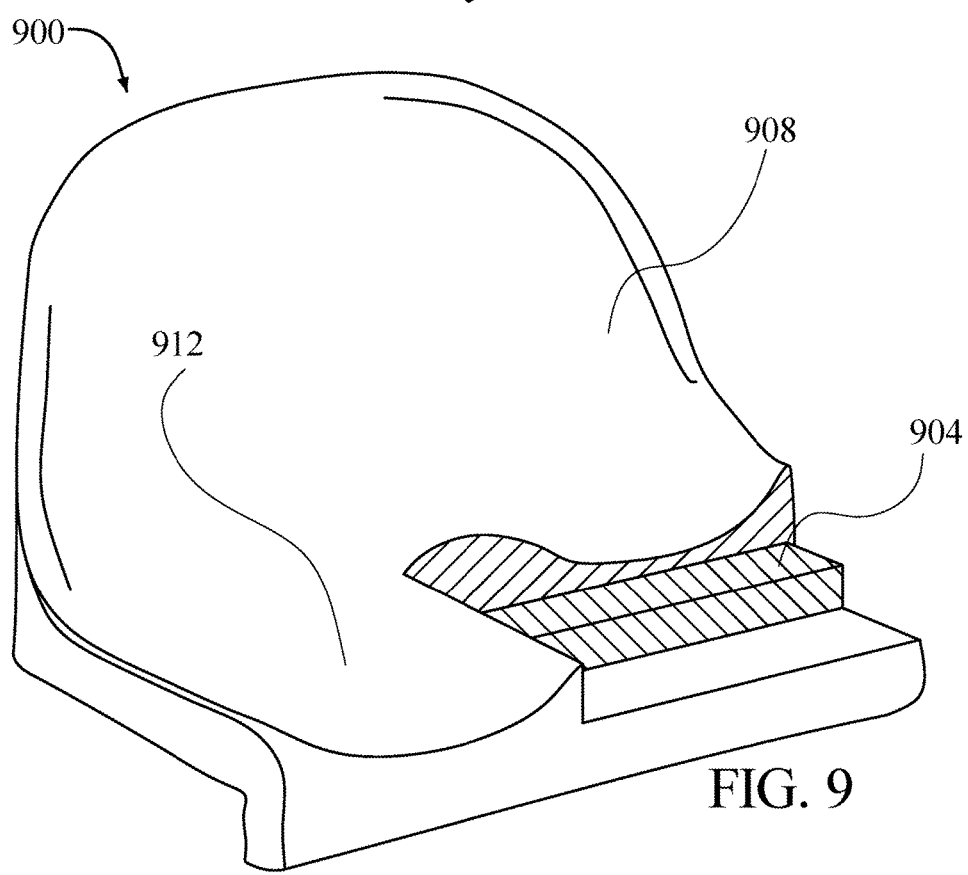
FIG. 9 is a perspective view of an exemplary seating unit in accordance with an embodiment.

Still referring to FIG. 9, seating unit 900 has an exterior surface 908. In some embodiments, exterior surface 908 is an exterior surface of core 904; in other words, seating unit 900 may be made up solely of core 904. In other embodiments, exterior surface 908 is composed of a distinct material or combination of materials from core 904. Exterior surface 908 may include a seating surface 912 on which a user of seating unit 900 may rest. Seating surface 912 may be composed of any rigid, flexible, elastic, or non-Newtonian material as described herein; seating surface 912 may be formed to ergonomically fit the body contours that a user may be expected to place on the seating surface 912. Where seating surface 912 is rigid, the seating surface 912 may be shaped to the user's contours; where seating surface 912 is flexible or elastic, it may mold itself to the user's contours.

In some embodiments, exterior surface 908 incorporates non-Newtonian materials. Non-Newtonian materials may be incorporated in exterior surface 908 according to any method for incorporation of non-Newtonian materials in core 904. In some embodiments, the flooring system 100 at least a first discrete layer 104 and at least a second discrete layer 108 may be replaced with at least a first layer and at least a second layer that are not discrete; for instance, the two layers may be intermixed to some extent, with an intermediate zone that blends the two layers, or may be combined to form a gradient that gradually transitions from one set of material ingredients to another set of material ingredients. First and second layer may alternatively be formed from a substantially homogeneous piece of material, such as a block, mat, or other piece, which may be treated in various ways by doping, injection, infusion, or other introduction of materials, or by differential curing processes using radiation, heat, chemical exposure, agitation, magnetic or electromagnetic processes, coating, and the like.

Figure 10:
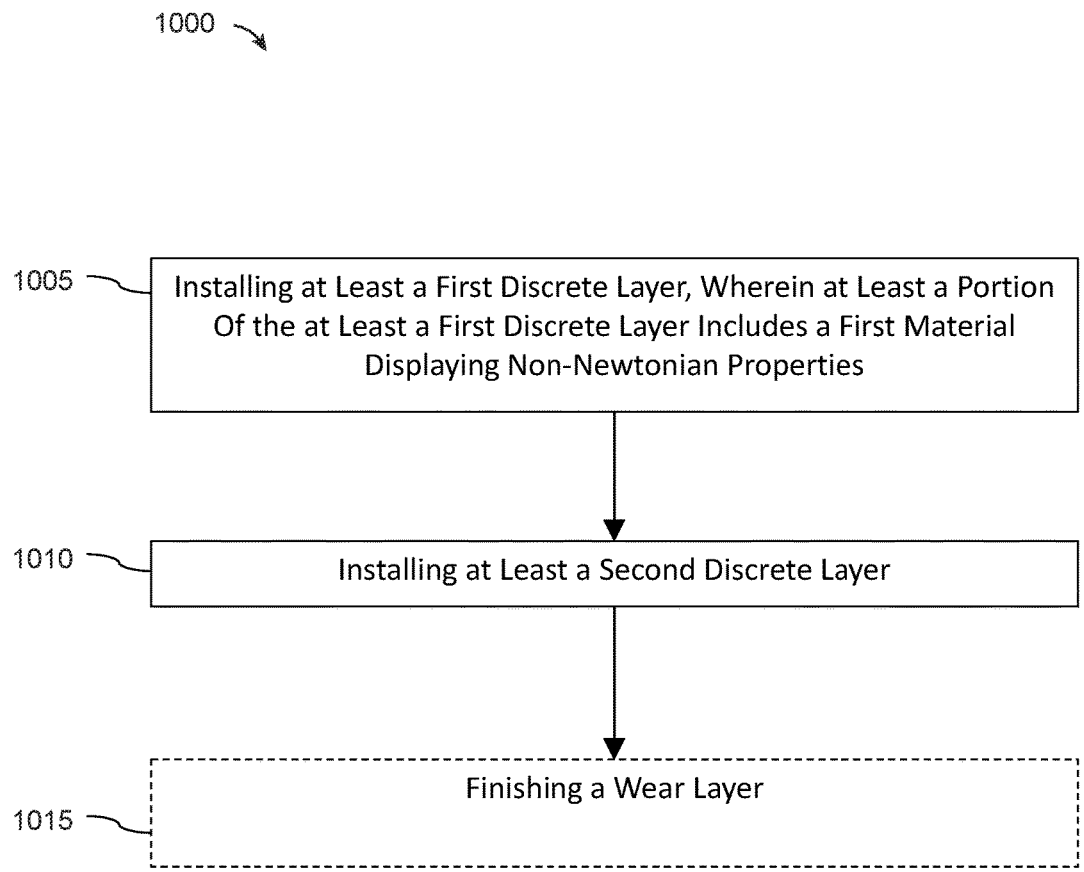
FIG. 10 is a flow diagram illustrating an exemplary method of assembling an athletic flooring system in accordance with an embodiment.

Referring now to FIG. 10, an exemplary method 1000 of assembling an athletic flooring system is presented. At step 1005, at least a first discrete layer is installed. At step 1010, at least a second discrete layer is installed. At optional step 1015, installing a second discrete layer includes finishing wear layer.

Still referring to FIG. 10, first discrete layer 104 may be installed on a substrate. Substrate may include a concrete slab, which may be installed according to applicable standards of humidity, levelness, and quality. As a non-limiting example, concrete slab may be trawled smooth. Concrete slab may be leveled to a specified tolerance, such as without limitation a level tolerance of ⅛" of variation on a 10-foot straightedge measurement. Concrete slab may be trawled smooth. Concrete slab may be allowed to dry for a certain period prior to further installation steps; as a non-limiting example, concrete slab may be allowed to dry until having a degree of humidity suitable for installing at least a first discrete layer. Substrate may be inspected for dryness and tolerance prior to additional installation steps. A vapor barrier may be applied to substrate; the vapor barrier may be any suitable vapor barrier, including without limitation vapor barrier 412 as described above.

Still referring to FIG. 10, and at step 1005, at least a first discrete layer 104 is installed. At least a first discrete layer 104 includes at least a first material displaying non-Newtonian properties. At least a first discrete layer 104 may include any at least a first discrete layer 104 as described above in reference to FIGS. 1-9. Installing at least a first discrete layer 104 may include installing one or more sublayers; one or more sublayers may be any sublayers as described above in reference to FIGS. 1-9. Installing each sublayer may include installing each sublayer at a prescribed angle with respect to substrate, one or more layers or sublayers above or below the sublayer, or a wear layer. For instance, where a sublayer is to be installed at approximately a 90 degree angle to a wear layer, sublayer may be installed at such an angle. Sections of subfloor may be installed in a prescribed relationship to one another; for example, a lower course of sections may be laid down in a prescribed order, and a higher course of sections may be laid on top of the lower course to produce spatial relationships between sections, courses of sections, or layers, for instance as described above in reference to FIGS. 1-9.

Continuing to refer to FIG. 10, at least a first discrete layer 104 may be any subfloor as described above in reference to FIGS. 1-9. At least a first discrete layer 104 may be any bottom layer 508 as described above in reference to FIGS. 5A-B. At least a first discrete layer 104 may be any bottom layer 608 as described above in reference to FIG. 6. At least a first discrete layer 104 may be any subfloor 804 as described above in reference to FIG. 8. At least a first discrete layer 104 may be rolled out as a mat. At least a first discrete layer 104 may be laid down in a plurality of sections; plurality of sections may be fastened together. Installing at least a first discrete layer 104 may include cutting portions of at least a first discrete layer 104 at borders of a room or other area where flooring system is installed, at door frames, at equipment or equipment sleeves, or in other locations. At least a first discrete layer 104 may be cut or spaced to permit expansion voids or other voids as described above in reference to FIGS. 1-9. In some embodiments, at least a first discrete layer 104 is installed by pouring material into a space to be occupied by at least a first discrete layer 104 and allowing the poured material to solidify.

Still referring to FIG. 10, sheathing may be installed above at least a first discrete layer 104, below at least a first discrete layer 104, or both. Sheathing may be installed as described above in reference to FIGS. 1-9. Installing sublayers may include fastening sublayers together. Installing sublayers may include fastening one or more sublayers to a substrate. As a non-limiting example, where substrate is concrete, concrete anchorage may be provided by steel channel sections, such as 16-gauge sections; steel channels may be double flange designs to capture side edges of subfloor anchor pockets, where present. Anchorage may be provided using collared drive pins, circular retention clips or cups, or the like.

With continued reference to FIG. 10, at step 1010, at least a second discrete layer 108 is installed. At least a second discrete layer 108 may include any at least a second discrete layer 108 as described above in reference to FIGS. 1-9. In an embodiment, installing at least a second discrete layer 108 includes installing a wear layer. Wear layer may be any wear layer as described above, including without limitation any wear layer described in reference to FIGS. 1-4, a top layer 504 of a flooring system 500 as described above in reference to FIGS. 5A-B, a top layer 604 of a turf flooring system 600 as described above in reference to FIG. 6, or a wear layer 804 as described above with respect to FIG. 8.

At least a second discrete layer 108 may be installed by rolling out mats or sections of material; for instance, where the at least a second discrete layer 108 includes a top layer 504 of a flooring system 500 or a top layer 604 of a turf flooring system 600, sections or mats of track or turf material may be laid out or unrolled. Sections or mats may be connected together by any suitable method, including adhesion, stitching, stapling, and the like. Installing at least a second discrete layer 108 may include pouring material; for instance, an elastic or polymeric wear layer may be poured or deposited in liquid or semiliquid form and cured or allowed to become firm. In an embodiment, a slurry of particles and liquid may be deposited. Installing at least a second discrete layer 108 may include scattering or spreading particulate matter such as fill 616 as described above in reference to FIG. 6.

Where at least a second discrete layer 108 includes planking or other wooden flooring, wooden flooring may be installed by depositing planks or boards; planks or boards may be fastened together by any suitable means including without limitation tongue and groove connections, cleats, staples, or nails. Where the flooring system to be installed is a hybrid flooring system 800 as described above in reference to FIG. 8, a first area 812 of wear layer 808 may be installed by one method, while a second area 816 is installed by another method; for example, and without limitation, first area 812 may be wooden flooring installed by depositing and fastening together planking, while second area 816 may be a polymer performance surface installed by rolling out or pouring out polymer material, and may also have additional support layers 820 desposited first. Persons of skill in the art, upon reading the whole of this disclosure, will be aware of many ways in which various styles of wear layers may be installed in various combinations.

At optional step 1015, and still referring to FIG. 10, installing a second discrete layer includes finishing a wear layer. Wooden or similar wear layers may be finished by sanding, such as machine sanding, and cleaning up sawdust that results from sanding; further finishing steps may include depositing indicia, varnishing, or coating the wear layers. Polymer and turf top layers may also have indicia deposited or installed; for instance, a turf layer may have strips of turf installed with contrast colors to create indicia. Finishing steps may involve subjecting flooring system to vibration, raking, or other methods to ensure that particulate matter is evenly distributed and adhesion is properly achieved.

Continuing to refer to FIG. 10, additional materials may be installed, including without limitation equipment sleeves, metal threshold coverings at doorframes, wiring, tubing, ducts, and the like. Rubber base material may be attached at borders of the floor, such as junctions with the wall. Rubber Base material may be affixed to a wall with fastening means including without limitation adhesives or screws. Persons skilled in the art will be aware of many auxiliary or additional elements of flooring systems that may be installed in addition to the flooring itself.

Still referring to FIG. 10, at least a first discrete layer 104 and at least a second discrete layer 108 may be installed simultaneously; for instance, where the flooring system is a rollout floor, such as a temporary or portable polymer performance surface, both at least a first discrete layer 104 and at least a second discrete layer 108 may be simultaneously rolled out. Similarly, where flooring system is a portable flooring system 700 as described above in reference to FIG. 7, at least a first discrete layer 104 and at least a second discrete layer 108 may be installed piecemeal and in parallel by the deposition and fastening together of modules 704 as described above.

Certain embodiments of a method for installing an athletic flooring system incorporating a dilatant material have been described herein. Described and depicted embodiments are presented herein for illustrative purposes only, to aid in understanding the disclosed installation method, and are not intended to limit the scope of the disclosed method to the particular embodiments depicted or illustrated. Persons skilled in the art, upon reading the entirety of this disclosure, will be aware of many possible alternative ways to implement installation of the athletic flooring system as disclosed, each of which are within the scope of this disclosure.

Figure 11:
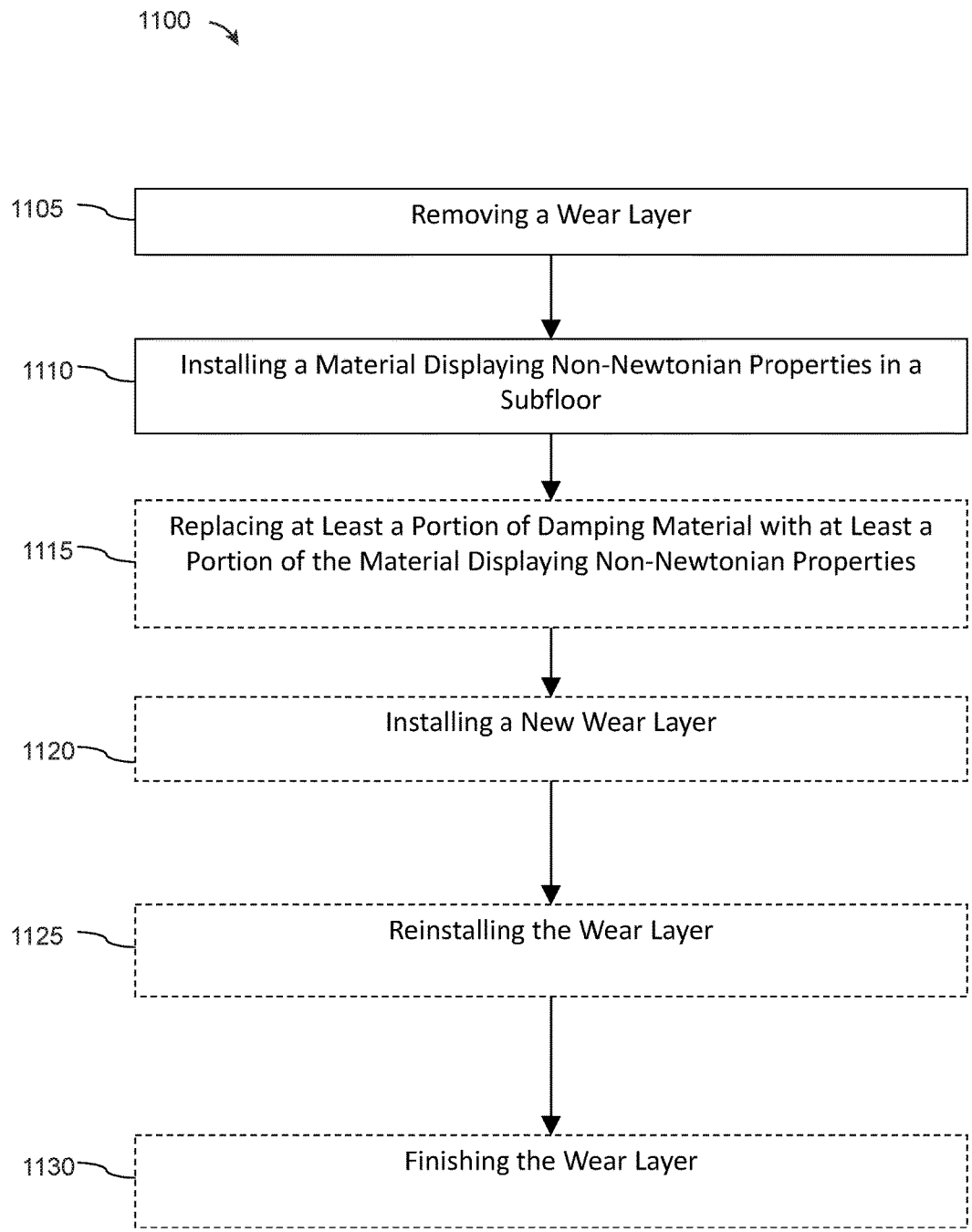
FIG. 11 is a flow diagram illustrating an exemplary method of converting an athletic flooring system comprising at least a subfloor and a wear layer in accordance with an embodiment.

Referring now to FIG. 11, an exemplary method 1100 of converting an athletic flooring system having at least a subfloor and a wear layer is described. At step 1105, a wear layer is removed. Wear layer may be any wear layer or performance surface as described above in reference to FIGS. 1-4. Removing wear layer may include unfastening fasteners, pulling up floor-boards, cutting, rolling up, or otherwise disassembling polymer or turf surfaces, taking apart modules 704 of a portable floor 700 as disclosed above in reference to FIG. 7, and other disassembly processes. Additional layers beneath wear layer may be removed, including without limitation any layers or sublayers described in reference to FIGS. 1-9. As a non-limiting example, one or more layers of sheathing may be removed.

At step 1110, and still referring to FIG. 11, a material displaying non-Newtonian properties is installed in the subfloor. Material displaying non-Newtonian properties may be any first material as described above in connection with FIGS. 1-4. In an embodiment, non-Newtonian material is installed on top of existing subfloor; for instance, a floor-wide layer of padding made of or including non-Newtonian material may be deposited on top of subfloor. As another non-limiting example, a plurality of sections containing non-Newtonian material separated by voids may be installed; plurality of sections containing non-Newtonian material may be any section containing non-Newtonian material as described above in reference to FIGS. 1-9. In an embodiment, installing non-Newtonian material involves removing one or more layers or subsections from subfloor and subsequently installing non-Newtonian material; one or more layers or subsections may be placed in subfloor on top of non-Newtonian material. For instance, an upper layer of subfloor may be taken up, and a pad composed wholly or in part of non-Newtonian material may be deposited, after which the upper layer of subfloor may be placed on top of the pad; where the pad composed in whole or in part of non-Newtonian material is slimmer than removed pad, an additional layer such as a layer of ventilating slats or ducts or of sheathing may be added, or the entire flooring system may be made slimmer. In an embodiment, one or more sections or layers in subfloor are replaced with non-Newtonian material. For instance, in optional step 1115, the subfloor includes at least a portion of damping material, and installing the material displaying non-Newtonian properties includes replacing the at least a portion of damping material with at least a portion 112 of the material displaying non-Newtonian properties. For instance, a lower layer 508 of a flooring system 500 as described in reference to FIGS. 5A-B may be replaced with a new lower layer 508 that incorporates non-Newtonian material. Similarly, a lower layer 608 of a turf flooring system 600 as described above in reference to FIG. 6 may be replaced with a new lower layer 608 that incorporates non-Newtonian material. Where flooring system is modular as disclosed above in reference to FIG. 7, elements of base layer 720 may be replaced with new elements, such as feet or supports, that contain non-Newtonian material. Replaced sections or elements may be shaped as permitted by advantages of non-Newtonian material, including without limitation being slimmer while producing the same or superior performance for impact absorption and/or vibration damping control, resulting in a lighter, slimmer, more portable, more ventilated, or otherwise improved flooring system. At least a portion of damping material may be included in subfloor in any manner for including first material in at least a first discrete layer 104 as described above in connection with FIGS. 1-9; replacing at least a portion of damping material with non-Newtonian material may cause subfloor to have any configuration of non-Newtonian material and other materials described above in reference to FIGS. 1-9. As a further example, non-Newtonian material may be introduced into one or more sections or layers of subfloor, for instance by injecting non-Newtonian fluids or gels into the one or more sections or layers, weaving in non-Newtonian impregnated fibers or filaments, and the like.

Continuing to refer to FIG. 11, method 1100 may include installing one or more layers on top of subfloor; one or more layers may be any layers suitable for use as part of at least a first discrete layer 104 or at least a second discrete layer 108. For instance, at optional step 1120, a new wear layer is installed. At optional step 1125, original wear layer that was removed is replaced. Any process for installing a wear layer or creating a performance surface as described above in reference to FIGS. 1-10 may be used. For instance, at optional step 1130, installed wear layer may be finished.

Still referring to FIG. 11, upgrading a flooring system through the integration of non-Newtonian material, whether performed according to method 1100 or any other method that a person skilled in the art will be able to deduce from reading the entirety of this disclosure, may confer various advantages. For example, and without limitation, the superior damping ability of dilatant material may enable the use of far slimmer and/or lighter damping sections or layers in the upgraded flooring. As a result, portable flooring such as rollup polymer flooring or modular flooring as described above in relation to FIG. 7 may be more compact and light, enabling safer, faster, and easier installation, assembly, disassembly, and/or storage of flooring or flooring sections. Similarly, the ability to use less volumes of material for damping when using dilatant material may enable the installation of additional voids, ducts, tubing, wiring, or other components in the newly unoccupied space, permitting superior structural integrity, more active or passive ventilation for humidity or temperature control, the use of heating or cooling elements to regulate temperature, or more complete and efficient integration of electrical, plumbing, or other systems into the flooring system.

With continuing reference to FIG. 11, additional elements may be combined with non-Newtonian material in different proportions to produce various damping and elastic effects as desired. For example, with non-linear damping behavior, a thick pad of material incorporating non-Newtonian material might allow more bounce/vibration at lower impacts than conventional damping material, producing a wider range of possible responses, and (for instance) allowing greater elasticity up to a certain kinetic energy point, then capping off the elasticity with abruptly stiffening or more viscous material. Thus, by selecting combinations of non-Newtonian components, elastic components, rigid components, and conventional damping components, the installer may be able to "tune" the floor to respond differently at different levels of impact, vibration rates, or other factors, as required for particular performance or injury prevention results. This may be used in a number of ways: sheer thinning material, for instance, might damp aggressively at small impacts while damping less for large ones, creating a floor that yields on large impacts and reduces blunt force injury. On the other hand, a sheer-thickening or dilatant material may be used to create a floor limiting vibration below a given amplitude chosen to limit injury or fatigue.

Certain embodiments of a method for installing an athletic flooring system incorporating a dilatant material have been described herein. Described and depicted embodiments are presented herein for illustrative purposes only, to aid in understanding the disclosed installation method, and are not intended to limit the scope of the disclosed method to the particular embodiments depicted or illustrated. Persons skilled in the art, upon reading the entirety of this disclosure, will be aware of many possible alternative ways to implement installation of the athletic flooring system as disclosed, each of which are within the scope of this disclosure. Persons skilled in the art will also be aware, upon reading the entirety of this disclosure, of many alternative ways that non-Newtonian material may be incorporated into existing flooring systems within the scope of this disclosure, including without limitation replacement of all or part of a wear layer, sheathing, fill 616 or other material with material having or including non-Newtonian components.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Furthermore, the foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:
1. A flooring system comprising:
  at least two discrete layers, wherein the at least two discrete layers include:
    at least a first discrete layer comprising a damped elastic subfloor, wherein:
      the elastic subfloor includes an elastic material causing the elastic subfloor to respond elastically to deformation and a damper comprising at least a portion of a first material displaying dilatant properties, the damper damping the elastic response of the elastic subfloor;

the at least first discrete layer includes a plurality of sublayers including at least an upper layer and a lower layer;

the upper layer includes a plurality of sections of the first material and a plurality of sections of at least a second material; and the lower layer includes a plurality of sections of the first material and a plurality of sections of at least a third material;

at least a second discrete layer comprising a wear layer disposed on top of the at least a first discrete layer.

2. The flooring system of claim 1, wherein the first material is incorporated in a non-fluid package.

3. The flooring system of claim 1, wherein the at least a first discrete layer includes a plurality of sections including the first material and a plurality of sections of at least a second material.

4. The flooring system of claim 3, wherein the at least a second material includes air.

5. The flooring system of claim 3, wherein the at least a second material includes a substantially rigid material.

6. The flooring system of claim 3, wherein each section of at least a second material includes a first portion composed of substantially rigid material and a substantially void second portion.

7. The flooring system of claim 3, wherein each of the plurality of sections including the first material further includes an elastic material.

8. The flooring system of claim 1, wherein the first material includes a dilatant polymer.

9. The flooring system of claim 1, wherein the lower layer further includes a plurality of sections of the at least a second material.

10. The flooring system of claim 1, wherein at least a second discrete layer includes a performance surface.

11. The flooring system of claim 1, wherein the at least a second discrete layer is composed at least in part of wood.

12. The flooring system of claim 1, wherein the at least a second discrete layer further comprises a turf layer.

13. The flooring system of claim 1, wherein the at least a second discrete layer further comprises a track surface.

14. A method of assembling an athletic flooring system, the method comprising:

installing at least a first discrete layer, comprising a damped elastic subfloor, wherein:

the elastic subfloor includes an elastic material causing the elastic subfloor to respond elastically to deformation and a damper comprising at least a portion of a first material displaying dilatant properties, the damper damping the elastic response of the elastic subfloor;

the at least first discrete layer includes a plurality of sublayers including at least an upper layer and a lower layer;

the upper layer includes a plurality of sections of the first material and a plurality of sections of at least a second material; and the lower layer includes a plurality of sections of the first material and a plurality of sections of at least a third material; and installing at least a second discrete layer comprising a wear layer disposed on top of the at least a first discrete layer.

* * * * *